US012093551B2

(12) United States Patent
Feldman et al.

(10) Patent No.: US 12,093,551 B2
(45) Date of Patent: *Sep. 17, 2024

(54) MEMORY UNIT PARTITIONING SOLUTIONS FOR RECONFIGURABLE DATAFLOW COMPUTING SYSTEMS

(71) Applicant: SambaNova Systems, Inc., Palo Alto, CA (US)

(72) Inventors: Matthew Feldman, Palo Alto, CA (US); Yaqi Zhang, Foster City, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,343

(22) Filed: Jun. 12, 2023

(65) Prior Publication Data

US 2023/0315322 A1    Oct. 5, 2023

Related U.S. Application Data

(63) Continuation of application No. 17/878,504, filed on Aug. 1, 2022, now Pat. No. 11,709,611.

(60) Provisional application No. 63/271,906, filed on Oct. 26, 2021.

(51) Int. Cl.
*G06F 3/06* (2006.01)
*G06F 9/50* (2006.01)

(52) U.S. Cl.
CPC .......... *G06F 3/0644* (2013.01); *G06F 3/0604* (2013.01); *G06F 3/0683* (2013.01); *G06F 9/5077* (2013.01)

(58) Field of Classification Search
CPC ..... G06F 3/0644; G06F 3/0604; G06F 3/0683
See application file for complete search history.

(56) References Cited

U.S. PATENT DOCUMENTS

| 4,204,636 | A  | 5/1980 | Hayman |
| 5,220,545 | A  | 6/1993 | Tomimitsu |
| 7,565,465 | B2 | 7/2009 | Secatch |
| 9,063,668 | B1 | 6/2015 | Jung et al. |
| 10,698,853 | B1 | 6/2020 | Grohoski et al. |

(Continued)

FOREIGN PATENT DOCUMENTS

| TW | 200736953 A | 10/2007 |
| WO | 2010142987 A1 | 12/2010 |

(Continued)

OTHER PUBLICATIONS

Cong et al., Automatic Memory Partitioning and Scheduling for Throughput and Power Optimization, ACM Transactions on Design Automation of Electronic Systems, vol. 16, No. 2, Article 15, dated Mar. 2011, 25 pages.

(Continued)

*Primary Examiner* — David Yi
*Assistant Examiner* — Nicholas A. Paperno
(74) *Attorney, Agent, or Firm* — Flagship Patents; Sikander M. Khan; Bruce A. Young

(57) ABSTRACT

A system includes a reconfigurable dataflow processor that comprises an array of compute units and an array of memory units interconnected with a switching fabric. The reconfigurable dataflow processor can be configured to execute a plurality of tensor indexing expressions and access the array of memory units according to a memory unit partitioning solution.

6 Claims, 18 Drawing Sheets

(56) References Cited

U.S. PATENT DOCUMENTS

| | | | |
|---|---|---|---|
| 10,831,507 | B2 | 11/2020 | Shah et al. |
| 10,970,217 | B1 | 4/2021 | Dastidar et al. |
| 11,204,889 | B1 | 12/2021 | Prabhakar et al. |
| 11,366,783 | B1 | 6/2022 | Prabhakar |
| 11,467,827 | B1 | 10/2022 | Zuckerman et al. |
| 2004/0100963 | A1 | 5/2004 | Guo |
| 2006/0190517 | A1 | 8/2006 | Guerrero |
| 2007/0028076 | A1 | 2/2007 | Wezelenburg et al. |
| 2007/0177677 | A1 | 8/2007 | Thomsen et al. |
| 2009/0031089 | A1 | 1/2009 | Tuominen |
| 2010/0313060 | A1 | 12/2010 | Bjoerklund et al. |
| 2014/0085318 | A1 | 3/2014 | Nadar et al. |
| 2014/0201642 | A1 | 7/2014 | Vicat-Blanc |
| 2014/0281417 | A1 | 9/2014 | Peters |
| 2015/0039851 | A1 | 2/2015 | Uliel et al. |
| 2016/0012012 | A1 | 1/2016 | Yen et al. |
| 2016/0055004 | A1 | 2/2016 | Grochowski et al. |
| 2016/0134702 | A1 | 5/2016 | Gertner |
| 2017/0031865 | A1 | 2/2017 | Eyole et al. |
| 2017/0083313 | A1 | 3/2017 | Sankaralingam et al. |
| 2017/0123794 | A1 | 5/2017 | Chen et al. |
| 2017/0317678 | A1 | 11/2017 | Coole et al. |
| 2018/0173668 | A1 | 6/2018 | Rusten et al. |
| 2018/0212894 | A1 | 7/2018 | Nicol et al. |
| 2018/0293185 | A1 | 10/2018 | Vembu et al. |
| 2018/0300181 | A1 | 10/2018 | Hetzel et al. |
| 2018/0324112 | A1 | 11/2018 | Nicol |
| 2018/0341487 | A1 | 11/2018 | Kim et al. |
| 2019/0042241 | A1 | 2/2019 | Akin et al. |
| 2019/0108423 | A1 | 4/2019 | Jones |
| 2019/0130270 | A1 | 5/2019 | Nicol et al. |
| 2019/0197655 | A1 | 6/2019 | Sun et al. |
| 2019/0229996 | A1 | 7/2019 | ChoFleming, Jr. et al. |
| 2019/0286973 | A1 | 9/2019 | Kovvuri et al. |
| 2019/0324888 | A1 | 10/2019 | Evans et al. |
| 2019/0385046 | A1 | 12/2019 | Cassidy et al. |
| 2019/0391811 | A1 | 12/2019 | Garegrat et al. |
| 2019/0392296 | A1 | 12/2019 | Brady et al. |
| 2020/0020156 | A1 | 1/2020 | Howson |
| 2020/0042856 | A1 | 2/2020 | Datta et al. |
| 2020/0097289 | A1 | 3/2020 | Eapen et al. |
| 2020/0142743 | A1 | 5/2020 | Zhang et al. |
| 2020/0159692 | A1 | 5/2020 | Shah et al. |
| 2020/0202198 | A1 | 6/2020 | Lee et al. |
| 2020/0211262 | A1 | 7/2020 | Vaidyanathan et al. |
| 2020/0225996 | A1 | 7/2020 | Sharma et al. |
| 2020/0302305 | A1 | 9/2020 | Oki et al. |
| 2020/0310994 | A1 | 10/2020 | Chofleming et al. |
| 2020/0349420 | A1 | 11/2020 | Ovsiannikov et al. |
| 2020/0410327 | A1 | 12/2020 | Chinya et al. |
| 2021/0011785 | A1 | 1/2021 | Sanghi et al. |
| 2021/0192314 | A1 | 6/2021 | Aarts et al. |
| 2021/0263853 | A1 | 8/2021 | Waters et al. |
| 2021/0265015 | A1 | 8/2021 | Parnaby et al. |
| 2022/0012058 | A1 | 1/2022 | Hanrahan et al. |
| 2022/0100680 | A1 | 3/2022 | Chrysos et al. |
| 2022/0188028 | A1 | 6/2022 | Mesnier et al. |

FOREIGN PATENT DOCUMENTS

| | | |
|---|---|---|
| WO | 2019202216 A2 | 10/2019 |
| WO | 2021247614 A1 | 12/2021 |
| WO | 2022010810 A1 | 1/2022 |
| WO | 2022066639 A1 | 3/2022 |

OTHER PUBLICATIONS

Koeplinger et al., Spatial: A Language and Compiler for Application Accelerators, PLDI '18, Jun. 18-22, 2018, Association for Computng Machinery, 16 pages.

Lopez, DA, A Memory Layout for Dynamically Routed Capsule Layers, 16th International Conference on Information Technology—New Generations (ITNG), pp. 317-324, Published in May 2019. [doi:http://dx.doi.org/10.1007/978-3-030-14070-0_43].

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Pawlowski et al., High performance tensor-vector multiplies on shared memory systems, published in 2019, 24 pages.

PCT/US/2021/040382—International Search Report and Written Opinion, dated Nov. 29, 2021, 22 pages.

PCT/US2021/035305—International Search Report and Written Opinion dated Sep. 1, 2021, 17 pages.

PCT/US2021/051305—International Search Report and Written Opinion, dated Jan. 11, 2022, 16 pages.

Podobas et al., A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

Rotem et al., Glow: Graph Lowering Compiler Techniques for Neural Networks, Cornell University Library, New York, dated May 2, 2018, 12 pages.

TW 110124802—First Office Action and Search Report dated May 24, 2022, 17 pages.

U.S. Appl. No. 16/922,975—Final Office Action, dated Mar. 9, 2023, 23 pages.

U.S. Appl. No. 16/922,975—Non-Final Office Action, dated Oct. 27, 2022, 26 pages.

U.S. Appl. No. 17/031,679—Notice of Allowance, dated Dec. 22, 2022, 13 pages.

U.S. Appl. No. 17/216,647—Notice of Allowance dated Aug. 13, 2021, 13 pages.

U.S. Appl. No. 17/216,647—Office Action dated Jun. 18, 2021, 20 pages.

U.S. Appl. No. 17/216,647—Response to Office Action dated Jun. 18, 2021, filed Jul. 29, 2021, 15 pages.

U.S. Appl. No. 17/216,650—Office Action dated Aug. 18, 2021, 25 pages.

U.S. Appl. No. 17/216,650—Office Action dated Jun. 30, 2021, 15 pages.

U.S. Appl. No. 17/216,650 Notice of Allowance, dated Feb. 16, 2022, 11 pages.

U.S. Appl. No. 17/216,650 Response to Office Action dated Aug. 18, 2021, filed Sep. 9, 2021, 13 pages.

U.S. Appl. No. 17/216,650 Response to Office Action dated Jun. 30, 2021, filed Jul. 29, 2021, 17 pages.

U.S. Appl. No. 17/878,504—Non-Final Office Action, dated Nov. 16, 2022, 11 pages.

U.S. Appl. No. 17/878,504—Notice of Allowance, dated Mar. 3, 2023, 8 pages.

Wang et al., Memory Partitioning for Multidimensional Arrays in High-level Synthesis, DAC 2013, dated May 29- Jun. 7, 2013, 8 pages.

Wang et al., Theory and Algorithm for Generalized Memory Partitioning in High-Level Synthesis, FPGA 2014, dated Feb. 26-28, 2014, 10 pages.

List of Related Cases for U.S. Appl. No. 18/208,343, filed Jun. 12, 2023, 2 pages.

$$BA = \lfloor \frac{\vec{x} \cdot \vec{\alpha}}{B} \rfloor \bmod N$$

$$BO = \left\lfloor B \cdot \sum_{i=0}^{n} \left( \lfloor \frac{\vec{x}_i}{\vec{P}_i} \rfloor \cdot \prod_{j=i+1}^{n} \lceil \frac{\vec{D}_j}{\vec{P}_j} \rceil \right) \right\rfloor + (\vec{x} \cdot \vec{\alpha} \bmod B)$$

1090 →
```
// Example:
for (int i = 0; i < 10; i++)
  if (i < 5)
    for (int j = 1; j < 10; j = j+2)
      if (j < 5)
        mem[2*i, j-1] = ...
```

1092 →
```
// Expressions that encode the iterator start, stop and stride values:
0 ≤ i < 10
1 ≤ j < 10
j = 2 * j_ + 1   // j_ is dummy variable that limits j to odd values
                 // (i.e., 1, 3, 5 ...).
```

1094 →
```
// loop true/false conditions:
i < 5
j < 5
```

1096 →
```
// Indexing expression for each dimension
dim0 = 2 * i
dim1 = j - 1
```

1098 →
```
// Indexing constraint statement/structure formulated as
// { [<dims header (i.e., variable list)>] : <expressions>}
{ [i, j, j_, dim0, dim1] :
  0 ≤ i < 10 and
  1 ≤ j < 10 and j = 2 * j_ + 1 and
  i < 5 and j < 5 and
  dim0 = 2 * i and
  dim1 = j - 1 }
```

FIG. 10C

| | COLUMN | | | |
|---|---|---|---|---|
| | 0 | 1 | 2 | 3 |
| 0 | 0 | 1 | 0 | 1 |
| R 1 | 1 | 0 | 1 | 0 |
| O | | | | |
| W 2 | 0 | 1 | 0 | 1 |
| 3 | 1 | 0 | 1 | 0 |

BA = (R+C) MOD N = (R+C) & 1

| | COLUMN | | | |
|---|---|---|---|---|
| | 0 | 1 | 2 | 3 |
| 0 | 0 | 0 | 1 | 1 |
| R 1 | 2 | 2 | 3 | 3 |
| O | | | | |
| W 2 | 4 | 4 | 5 | 5 |
| 3 | 6 | 6 | 7 | 7 |

BO = (2R+C)/N = R+R+(C>1)

```
/* Structs & Helper Functions */
using IndexingConstraint = isl_set;
struct Access {
   IndexingConstraint pattern;
}
struct AccessGroup {
   vector<Access> accesses;
}
struct PartitioningSolution {
   int N;
   int B;
   vector<int> alpha;
}
struct BankingScheme {
   PartitioningSolution G;
   vector<int> P;
}

// Iterate over all combinations of schemes selected from candidates
vector<possibleSolutions> generate_solution_candidates(vector<int> N_candidates,
   vector<int> B_candidates, vector<vector<int>> alpha_candidates) {
   vector<PartitioningSolution> candidateSolutions;
   for (auto N : N_candidates)
    for (auto B : B_candidates)
     for (auto alpha : alpha_candidates) {
       auto test = PartitioningSolution(N, B, alpha)
       // We can immediately filter out candidates based on some heuristics, not shown here
       if (preliminary_checks_ok(test))
          candidateSolutions.push_back(test)
     }
   return candidateSolutions;
}

// Place accesses into groups based on read/write and relative concurrency
vector<AccessGroup> form_access_groups(vector<Access> accesses) {
   vector<vector<Access>> groupings;
   for (auto acc : acce8sses) {
    bool placed = false;
    for (int candidate_grp = 0; candidate_grp < groupings.size(); candidate_grp++) {
      for (auto other_acc : groupings[candidate_grp]) {
        if (both_rd_or_both_wr(acc, other_acc) && can_run_concurrently(acc, other_acc)) {
          groupings[candidate_grp].push_back(acc);
          placed = true;
        }
      }
    }
    if (!placed)
     groupings.push_back({acc});
   }
}
```

FIG. 12A

```
// Get every possible pair of accs from this group.
vector<pair<Access, Access>> pairs(vector<Access> accs) {
  vector<pair<Access, Access>> pairs;
  for (int i = 0; i < accs.size(); i++)
    for (int j = i+1; j < accs.size(); j++)
      pairs.push_back({accs[i], accs[j]})
  return pairs;
}
bool check_for_conflicts(pair<Access, Access> pair, PartitioningSolution candidateSolution) {
IndexingConstraint conflict = pair.first.pattern - pair.second.pattern
  // If candidateSolution.B == 1, we can apply scheme directly and check if its empty,
  if (candidateSolution.B == 1) {
    return !isl_set_is_empty(apply_candidate_solution(candidateSolution, conflict));
  } else {
    // Conceptually, this is doing the same thing as the above case but in a slightly different way
    return !isl_set_is_empty(generate_block_cyclic_exprs(candidateSolution, pair.first, pair.second));
  }
}
vector<vector<int>> calculate_Ps(PartitioningSolution) {
  // Build every possible neighborhood solution.
  // Roughly, a neighborhood is valid if it contains each bank
  // B or fewer times.
}

/* BANKING ALGORITHM */
// Collect possible N's, B's, and alpha's (selection strategy not shown here)
vector<Access> accesses = ... // collect all accesses on memory and make them IndexingConstraints
vector<AccessGroup> groups = group_accs_by_concurrency_and_rd_wr(accesses)
vector<PartitioningSolution> valid_solutions;
valid_solution : for (auto candidateSolution : find_valid_solutions(Ns, Bs, alphas)) {
  test_group : for (auto group : groups) {
    int confl_count = 0;
    test_pair : for (auto pair : pairs(group.accesses)) {
      // Reject candidate if the number of conflicts is >= number of ports within this group.
      if (check_for_conflicts(pair, candidateSolution) confl_count++;
      if (confl_count >= num_ports) continue test_candidate;
    }
  }
  // Accept candidate if no group violates the conflict rule above
  valid_solutions.push_back(candidateSolution)
}

// Calculate all solutions for Ps for each candidate and select lowest cost solution
selected_solution : select_solution (valid_solutions) {
  lowest_cost = MAX_COST; selected_solution = NULL;
  for (auto candidateSolution : valid_solutions)
    for (auto Ps : calculate_Ps(candidateSolution)
      if (this_cost = banking_cost(this_solution = BankingScheme(candidateSolution, Ps)) < lowest_cost)
        selected_solution = this_solution; lowest_cost = this_cost;
  return(selected_solution)
}
// Capacity-split
// If one bank is bigger than one pmu, keep increasing N until one bank fits in one pmu
```

FIG. 12B

```
/***** Code snippet in app *****/
matrix<int> mem[64, 32] //64x32
matrix
for (auto i = 0; i < 64; i++)
  for (auto j = 0; j < 32; j++)
    mem[i, j] = ...                    ⬉ 1310,
                                        / 735 for (auto i = 0; i < 64; i=i+16;
PAR_FACTOR = 2)
  for (auto ii = 0; ii < 16; ii++)
    for (auto j = 0; j < 32; j++)
      ... = mem[i + ii, j]
```

FIG. 13A

```
/***** Build IndexingConstraints *****/
W = {[addr0, addr1, i, j] :
  addr0 = i and
  addr1 = j and           ⬉ 1320,
  0 <= i < 64 and            745
  0 <= j < 32
}
```

// There is a little trickery with this i0 and
// i_. i0 is the value observed by lane 0, i_
// is the underlier that is shared across all
// lanes. i_ needs to be an unbounded
// integer that encodes the stride and start
// value of i0.
```
R0 = {[addr0, addr1, i0, i_, ii, j] :
  addr0 = i0 + ii and
  addr1 = j and           ⬉ 1320,
  0 <= i0 < 64 and           745
  i0 = 32 * i_ + 0 and
  0 <= ii < 16 and
  0 <= j < 32
}

R1 = {[addr0, addr1, i1, i_, ii, j] :
  addr0 = i1 + ii and
  addr1 = j and
  0 <= i1 < 64 and        ⬉ 1320,
  i1 = 32 * i_ + 16 and      745
  0 <= ii < 16 and
  0 <= j < 32
}
```

```
/***** Group accesses *****/
Group0 = {W0}
Group1 = {R0, R1}
// because they are concurrent and both
// are reads. If you have no loop
// parallelization, but you have mem[i] +
// mem[i+1] in the body of a loop, this
// also creates two concurrent reads
```

```
/***** Test Candidates *****/
// Just walking through these two in this demo
// * N=2, B=1, a=1,1
// * N=2, B=16, a=1,0
// Group0 has one access, so no pairs, so we just
// ignore it. Group1 has two accesses, so one pair,
// we will just check that // Test first scheme:

// Everything drops out except i from lane 0 is
// always 16 ahead of i from lane 1:
R0 - R1 = {[addr0, addr1] :
  addr0 = -16 and
  addr1 = 0
}
// Apply solution: (addr0 * alpha0 + addr1 *
// alpha1 / B) % N
{[bank] : bank = -16 / 1 % 2}

// Check if this every collides (i.e. R0 mapped
// under solution collides with R1 mapped under
// solution, or in other words bank=0 in the
// IndexingConstraint above)
{[] : 0 = -16 % 2}
// -16 % 2 = 0. 0 = 0 is true, so this
// IndexingConstraint is NOT empty. If this reduced
// to 1 = 0, this statement is false and therefore the
// IndexingConstraint WOULD BE empty
// Usually the checks are more interesting, like
{[i] : 0 = (2*i + 1) % 2}
// which can never equal zero // Test second scheme:

// Using the magic of the block-cyclic constraints {[k0,
k1, i0, i1, i_, ii] :
    (k0 * 16 * 2 + k1 * 16) <= i0 + ii < (k0 * 16 * 2
    + k1 * 16) + 16 - 1 and
    k1 * 16 <= i1 + ii < k1 + 16 - 1 and
  0 <= i0 < 64 and  i0 = 32 * i_ + 16 and
  0 <= i1 < 64 and  i1 = 32 * i_ + 16 and
  0 <= ii < 16
}

// If you plug this into ISL library, it will tell you
// there are no integer solutions in this set.
// I.e. no possible combination of values for the
// header k0, k1, ..., j will result in every
// condition being true /* Get BankingScheme from
   PartitioningSolutions */

// Only valid scheme is N=2, B=16, alpha=1,0.
// In other words, every column in the first 16
// rows belongs in bank 0, every column in the
// next 16 rows belongs in bank 1, then the
// next 16 are back in bank 0, and the last
// 16 are back in bank 1.

// The only way to draw a neighborhood that
// meets the P's criteria in `calculate_Ps` is to
// set the shape to 32,1. Every 32,1 box in
// the 64x32 matrix contains exactly 16 entries
// in bank 0 and 16 entries in bank 1.

/***** Output of banking solver *****/
// We now have N, B, alpha, and P, so we
// can directly apply equations BA and BO to
// map a logical address to the bank and offset
// within the bank that it maps to BA becomes
// predication on the Memory Unit, indicating if
// this Memory Unit should respond or if the
// request will be serviced by another Memory
// Unit. BO becomes the physical scratchpad
// offset for that Memory Unit
```

FIG. 13D

```
array<int> mem[16] // 16-word memory
for (int i = 0; i < 16; i = i + 4; VECTORIZE=4) {
        mem[i] = ...
}
```

// For this basic example the tensor 'mem' has 16 words, and the iterator is vectorized by 4
// (often this is 16 or greater). This means on the loop needs the following elements as the
// iterator progresses:
//   Iteration 0 = 0..3
//   Iteration 1 = 4..7
//   Iteration 2 = 8..11
//   Iteration 3 = 12..15

// In this case, we can pre-process this access by compressing everything by the vectorization
// length (4) resulting in the following tensor indexing expression:

```
array<4xint> mem[4] // 4-"word" memory
for (int i = 0; i < 4; i = i;) {
        mem[i] = ...
}
```

// Then we run banking analysis as usual and pretend vectorization doesn't exist.
// (Let's assume this memory is used elsewhere and that access has parallelization).
// When have the best scheme in-hand, we just have to remember to divide all the
// addresses by the vector length (e.g., 4) before plugging into BA and BO equations to
// compensate for compressing everything by a factor of 4 when running the banking analysis.

// The reason we can get away with compression for this example is because the start (0),
// stop (16), and stride (4) of the indexing expression are all divisible by the vectorization
// length (4).

// Whatever banking scheme we choose, we have to make sure that all of the word addresses
// in a particular iteration reside in the same bank (memory unit).

FIG. 14

```
// Address Generation Example matrix<int> mem[40, 40] //40x40 matrix
for (int i = 0; i < 40; i++; PAR_FACTOR=10)
  for (int j = 0; j < 40; j++)
    mem[i,j] = ...

// Candidate solution:
N=10, B=1, a=<1,0>, P=<10,1>

// Plugging in to the equations:
//   BA = i % 10
//   BO = (i / 10) * 40 + j
// Modulo and division by powers-of-2 may be accomplished with shift operators
// However, modulo and division by 10 may not be supported by the address generators of the
PMUs
// Nevertheless, we can use some counter optimizations to make this scheme work.
// For example, the above tensor indexing expressions can be refactored to:

for (int i_div = 0; i_div < 40; i_div = i_div + 10)
  for (int i_mod = 0; i_mod < 10; i_mod++; PAR_FACTOR=10)
    for (int j = 0; j < 40; j++)
      mem[i_div + i_mod, j]

// The original i is now equal to i_div + i_mod. The equations now result in:
//   BA = (i_div + i_mod) % 10
//   BO = (i_div + i_mod) / 10 * 40 + j
// In BA, adding i_div has no effect on this mod, because i_div's stride is equal to 10
// In BO, adding i_mod has no effect on this division, because it will never push i_div + i_mod
// from one bracket of size 10 to the next.
// The equations simplify to
//   BA = i_mod
//   BO = (i_div / 10) * 40 + j // Because i_div has a stride of 10, the division can be absorbed into the counter.
// The outermost loop would become:
for (int i_div_10 = 0; i_div_10 < 4; i_div_10++)
// The BO would become
    BO = i_div_10 * 40 + j // All of the division and modulo by non-powers-of-2 are now gone.
```

FIG. 15

MEMORY UNIT PARTITIONING SOLUTIONS FOR RECONFIGURABLE DATAFLOW COMPUTING SYSTEMS

PRIORITY APPLICATION

This application is a continuation of and claims the benefit of U.S. patent application Ser. No. 17/878,504, filed Aug. 1, 2022, entitled "Determining and Using Memory Unit Partitioning Solutions for Reconfigurable Dataflow Computing Systems," which claims priority to U.S. Patent Application No. 63/271,906, filed Oct. 26, 2021, entitled "Automatic Tensor Partitioning," all which are incorporated by reference herein for any and all purposes as if fully set forth herein.

RELATED APPLICATIONS AND DOCUMENTS

This application is related to the following papers and commonly owned applications:

U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION,";

U.S. Nonprovisional patent application Ser. No. 16/922,975, filed Jul. 7, 2020, entitled "RUNTIME VIRTUALIZATION OF RECONFIGURABLE DATA FLOW RESOURCES,"; and U.S. Nonprovisional patent application Ser. No. 17/216,647, filed Mar. 29, 2021, entitled "TENSOR PARTITIONING AND PARTITION ACCESS ORDER,".

All of the related application(s) and documents listed above are hereby incorporated by reference herein for all purposes.

BACKGROUND

The present subject matter relates to determining and using memory unit partitioning solutions for reconfigurable dataflow computing systems.

Reconfigurable processors can be configured to implement a variety of functions more efficiently or faster than might be achieved using a general-purpose processor executing a computer program. For example, coarse-grained reconfigurable architectures (e.g., CGRAs) have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Memory unit management can dramatically affect the performance of dataflow computing systems.

SUMMARY OF THE INVENTION

A system for determining and using memory unit partitioning solutions for reconfigurable dataflow computing systems includes a parser that receives and parses source code for a reconfigurable dataflow processor, a tensor expression extractor that extracts tensor indexing expressions from the source code, a logical memory constraint generator that converts the tensor indexing expressions to logical memory indexing constraints, a grouping module that groups the logical memory indexing constraints into concurrent access groups and a memory partitioning module that determines a memory unit partitioning solution for each concurrent access group. The system also includes a reconfigurable dataflow processor that comprises an array of compute units and an array of memory units interconnected with a switching fabric. The reconfigurable dataflow processor may be configured to execute the plurality of tensor indexing expressions and access the array of memory units according to the memory unit partitioning solution. A corresponding method and computer-readable medium are also disclosed herein.

BRIEF DESCRIPTION OF THE DRAWINGS

FIG. 10C shows one example of pseudo-code processed according to the method depicted in FIG. 10B.

FIG. 12A and FIG. 12B illustrate one example of pseudo-code corresponding to portions of the methods depicted in FIG. 8 and FIG. 10A.

FIGS. 13A, 13B, 13C, and 13D illustrate an example of tensor indexing expressions at various stages of processing in accordance with the means and methods disclosed herein.

FIG. 14 illustrates an example of tensor vectorization in accordance with the systems and methods disclosed herein.

FIG. 15 illustrates tensor indexing expression refactoring to simplify logical-to-physical address mapping in accordance with the systems and methods disclosed herein.

DETAILED DESCRIPTION

The following detailed description is made with reference to the figures. Example implementations are described to illustrate the technology disclosed, not to limit its scope, which is defined by the claims. Those of ordinary skill in the art will recognize a variety of variations on the description that follows.

The following definitions may be helpful in understanding this detailed description:

Tensor Indexing Expression: A block of source code that references a tensor and specifies indexing operations for accessing the tensor and performing corresponding mathematical operations. The source code could be high-level user-specified source code or a compiler-generated intermediate representation thereof.

Logical memory: Memory referenced in a user program such as memory referenced by tensor indexing expressions.

Compute unit: A processor that performs mathematical operations on tensors. The processor may be vectorized and operate on an entire vector or submatrix (e.g., in a single cycle). It may also be referred to as a 'pattern compute unit' (PCU).

Memory unit: A block of scratchpad memory typically used for sourcing and receiving tensor computations. As described elsewhere herein, memory units are assumed to operate cooperatively with compute units and may be provided with an address generator to generate a pattern of read/write memory addresses to facilitate sourcing data to, and/or receiving data from, compute units. It may also be referred to as a 'pattern memory unit' (PMU). A group of memory units may be referred to as a memory bank.

Switching/communication fabric: A switching fabric that interconnects arrays of compute units and arrays of memory units and enables the routing of tensor data between compute units, memory units and external ports.

Logical banking/partitioning solution: A memory banking/partitioning solution that maps to 'logical/virtual' memory units (e.g., PMUs) of unlimited size. May also be referred to as a virtual banking/partitioning solution.

Physical banking/partitioning solution: A memory banking/partitioning solution that maps to physical memory units (e.g., PMUs) of limited size.

Banking/partitioning solution: A memory banking/partitioning solution which could be 'logical/virtual' or 'physical'.

Resource Demand: The quantity of resources required (e.g., number of read ports or write ports) for unhindered computation and dataflow.

Resource Conflict: A situation where the required resources exceed the available or allocated resources.

FIG. 1A-1C and FIGS. 2-5 show one example of an environment wherein the present invention may be deployed and provide more information on compute units, memory units and address generators.

Figure 1A:
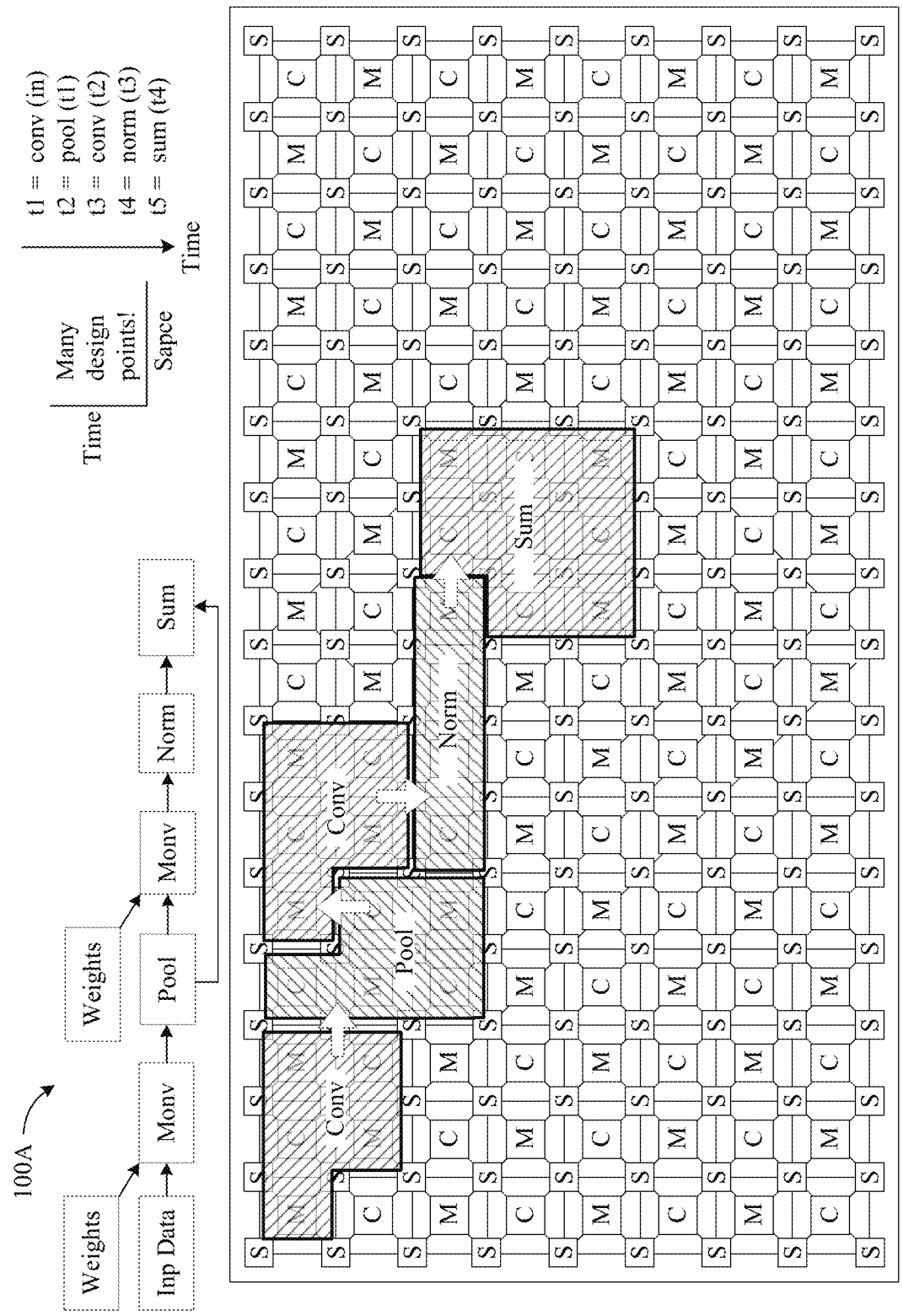
FIG. 1A is a layout diagram illustrating a CGRA (Coarse-Grained Reconfigurable Architecture) suitable for dataflow computing.
Figure 1B:
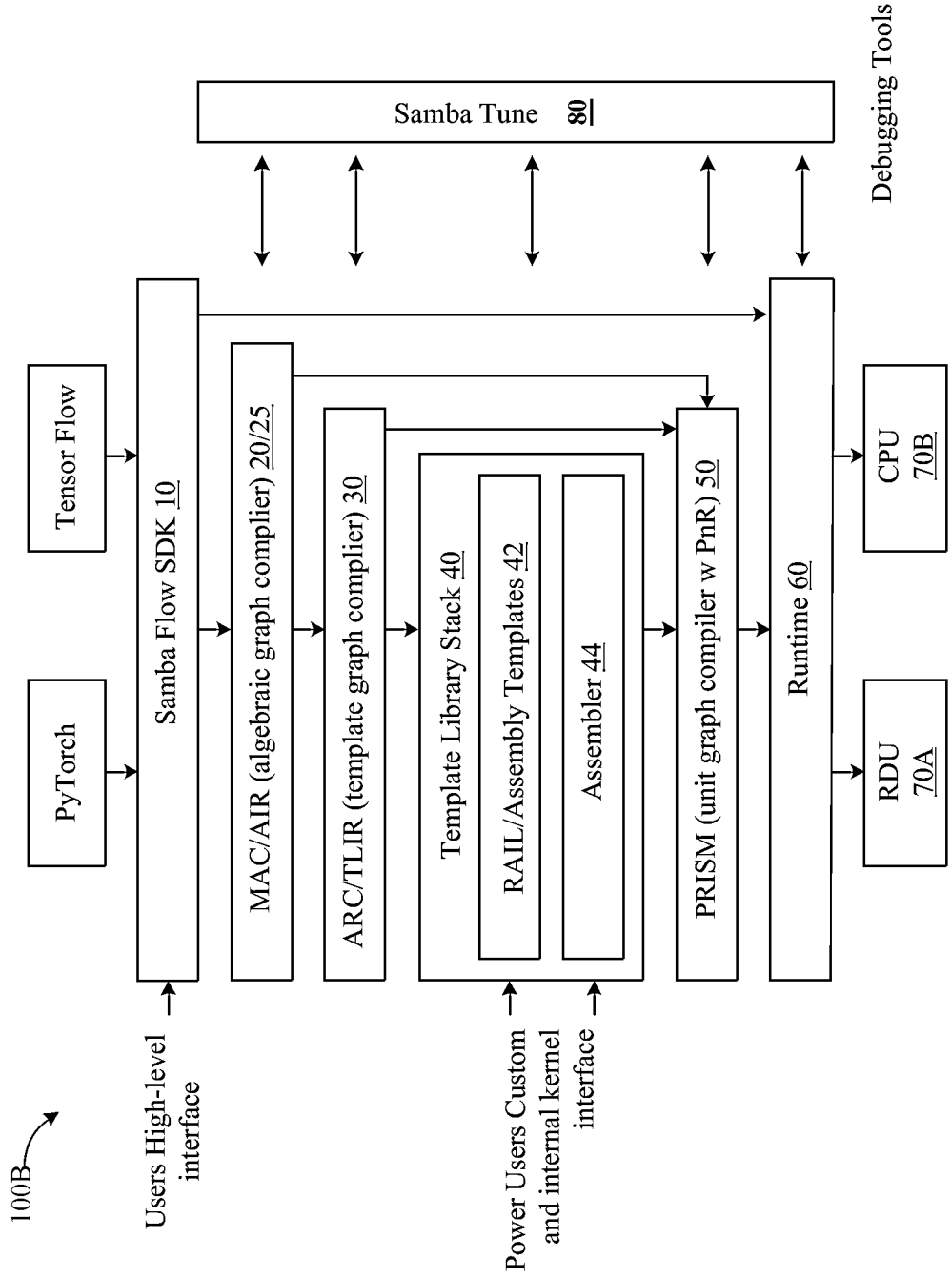
FIG. 1B is a block diagram of a compiler stack suitable for a CGRA (Coarse-Grained Reconfigurable Architecture).

Referring now to FIGS. 1A and 1B, FIG. 1A is a layout diagram illustrating a CGRA (Coarse Grain Reconfigurable Architecture) 100A suitable for dataflow computing. The depicted CGRA comprises compute units and memory units interleaved into a computing grid. The compute units and memory units as well as address generation units (not shown in FIG. 1) may be reconfigurable units that support dataflow computing. One or more instances of the depicted CGRA computing grid along with some external communication ports (not shown) may be integrated into a computational unit referred to as an RDU (Reconfigurable Dataflow Unit).

The architecture, configurability and dataflow capabilities of the CGRA enables increased computing power that supports both parallel and pipelined computation. Consequently, the CGRA represents a computing paradigm shift that provides unprecedented processing power and flexibility. Leveraging the parallel, pipelined and reconfigurable aspects of the CGRA adds new dimensions of complexity that requires a fundamentally new instruction compilation process and software stack.

While traditional compilers sequentially map operations to processor instructions, typically without regard to pipeline utilization and duration (a task usually handled by the hardware), the course-grained reconfigurable computing grid requires mapping operations to processor instructions in both time and space. Furthermore, while communication through the memory hierarchy of traditional (e.g., von Neumann) computers is implicitly sequential and handled by hardware, dataflow compilers map both sequential (including pipelined) operations and parallel operations to instructions in time and in space and may also program the communication between the compute units and memory units.

The depicted example, which illustrates typical machine learning operations on images, includes two stages of convolution operations that are augmented with a pooling stage, a normalization stage, and a summing stage. One of skill in the art will appreciate that the depicted stages may be used as a highly efficient pipeline if the throughputs of the stages are appropriately matched. One of skill in the art will also appreciate that other operations and tasks may be executing in parallel to the depicted operations and that the allocation of resources must be spatially and temporally coordinated. Consequently, compiler (and optionally programmer) assignment of compute and memory resources to the various stages of processing (both spatially and temporally) has a direct effect on resource utilization and system performance.

FIG. 1B is a block diagram of a compiler stack 100B suitable for a CGRA (Coarse Grain Reconfigurable Architecture). As depicted, the compiler stack 100B includes a number of stages or levels that convert high-level algorithmic expressions and functions (e.g., PyTorch and TensorFlow expressions and functions) to configuration instructions for the reconfigurable units of the CGRA.

The SambaFlow SDK 10 converts user selected and configured algorithms and functions from high-level libraries such as PyTorch and TensorFlow to computational graphs. The nodes of the computational graphs are intrinsically parallel unless a dependency is indicated by an edge in the graph.

The MAC (Model Analyzer and Compiler) level 20 makes high-level mapping decisions for (sub-graphs of the) computational graphs based on hardware constraints. The depicted embodiment supports various application frontends such as Samba, JAX, and TensorFlow/HLO. The MAC may also transform the graphs via autodiff and GradNorm, perform stitching between sub-graphs, interface with template generators for performance/latency estimation, convert Samba operations to AIR (Arithmetic/Algebraic Intermediate Representation) operations, perform tiling, sharding and section cuts and model/estimate the parallelism that can be achieved on the computational graphs.

The AIR level 25 translates high-level graph and mapping decisions provided by the MAC level into explicit TLIR (Template Library Intermediate Representation) graphs. The key responsibilities of the AIR level 25 include legalizing the graph and mapping decisions of the MAC, expanding data parallel, tiling, metapipe, region, and hypersection instructions provided by the MAC, converting AIR operations to TLIR operations, inserting stage buffers and skip buffers, eliminating redundant operations, buffers and sections and optimizing for resource use, latency, and throughput.

The ARC level 30 translates mid-level (e.g., TLIR) graphs provided by AIR into Prism source code optimizing for the target hardware architecture and legalizes the dataflow graph through each performed step. The translating is accomplished by converting IR (intermediate representation) operations to appropriate Prism/RAIL (RDU Abstract Intermediate Language) templates, stitching templates together with data-flow and control-flow, inserting necessary buffers and layout transforms, generating test data and optimizing for resource use, latency, and throughput.

The template library stack (or RAIL layer) 40 provides a library of templates 42 and functions to leverage those templates. The templates 42 are containers for common operations. Templates may be implemented using Assembly or RAIL. While RAIL is similar to Assembly in that memory units and compute units are separately programmed, RAIL provides a higher level of abstraction and compiler intelligence via a concise performance-oriented DSL (Domain Specific Language) for RDU templates. RAIL enables template writers and external power users to control the interactions between the logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs). RAIL also enables event handle allocation.

The Assembler level 44 provides an architecture agnostic low-level programming model as well as optimization and code generation for the target hardware architecture. Responsibilities of the Assembler include address expression compilation, intra-unit resource allocation and management, legalization with target-specific rules, low-level architecture-specific transformations and optimizations, and architecture-specific code generation.

The Prism layer 50 translates ARC template graphs to a physical chip mapping, generates code for the target hardware architecture, legalizes and lowers dataflow graphs to the physical network (e.g., PCUs, PMUs and switches) and produces PEF (Processor Executable Format) files. The Prism layer 50 also conducts PNR (Place and Route) by generating bandwidth calculations, determining the placement of PMUs and PCUs, allocating AGCUs (address generation control units) and VAGs (Virtual Address Generators), selecting PCM/PCU ports and generating configuration information for compute grid switches to enable data routing.

The runtime layer 60 controls execution of the physical level dataflow graphs on actual hardware such the RDU 70A and/or CPU 70B. SambaTune 80 is a set of debugging tools that can facilitate users to perform deadlock and performance debugging RDUs. SambaTune 80 can summarize and visualize instrumentation counters from the RDU that can guide users to identify performance bottlenecks and eliminate by tuning various control parameters.

Array Level Network (ALN)—A Flexible Network for Dataflow Processing

Referring now to FIG. 1C through FIG. 5 generally, a tile of an embodiment of a coarse-grain reconfigurable architecture (CGRA) is based on an array of fused compute-memory units (FCMUs), pattern memory units (PMUs), and/or pattern compute units (PCUs) arranged in two dimensions, M×N. Unless clearly noted from context, any reference to a FCMU, PCU, or PMU may refer to one or more of the other units. The communication between a set of FCMUs is performed over a (M+1)×(N+1) switch fabric called the array-level network (ALN) where each switch has connections to its neighboring FCMUs and to neighboring switches in each of the four directions.

The ALN includes three physical networks—Vector, Scalar and Control. The vector network and scalar networks are packet switched whereas the control network is circuit switched. Each vector packet consists of a vector payload and a header that includes information such as the packet's destination, sequence ID, virtual channel (aka flow control class) etc. Each scalar packet contains a word (32-bits) of payload and a header containing the packet's destination and the packet's type. The Control network consists of a set of single bit wires where each wire is pulsed to transmit a specific control token providing distributed control to orchestrate the execution of a program across multiple FMCUs. The scalar network can also be used to carry control information by overloading a scalar packet using its packet type field.

Parallel Applications such as Machine Learning, Analytics, and Scientific Computing require different types of communication between the parallel compute units and the distributed or shared memory entities. These types of communication can be broadly classified as point-to-point, one-to-many, many-to-one and many-to-many. The ALN enables these communication types through a combination of routing, packet sequence ID and flow control.

Routing of packets on the vector and scalar networks is done using two mechanisms—2D Dimension Order Routing (DOR) or using a software override using Flows. Flows can be used for multiple purposes such as to perform overlap-free routing of certain communications and to perform a multicast from one source to multiple destinations without having to resend the same packet, once for each destination.

Sequence ID based transmissions allow the destination of a many-to-one communication to reconstruct the dataflow order without having to impose restrictions on the producer/s. The packet switched network provides two flow control classes—end to end flow controlled and locally flow controlled. The former class of packet, VC_B, is released by a producer only after ascertaining that the consumer has space for it. The latter class of packet, VC_A, is loosely flow controlled and released into the network without knowing if the receiver has space for it. VC_A packets are used for performance critical communication where a non-overlapping route can be provided between the producer and consumer.

The core component of the ALN is the ALN switch. A packet or control pulse enters the ALN through an interface between the producing FCMU(X) and one of its adjacent switches. While in the ALN, the packet/pulse takes some number of hops until it reaches a switch adjacent to the consumer FCMU (Y). Finally, it takes the interface to Y to complete the route.

When a packet reaches a switch's input port, it is first inspected to see if it should be dimension order routed or flow routed. If it is the former, the destination ID is mapped to a unique output port. If it is the latter, the flow ID of the incoming packet is used to index into a table that identifies the output ports to route the packet to.

Packets from the two different flow control classes, VC_A and VC_B, are managed differently at the source port of every switch. Since VC_B packets are end-to-end flow controlled, they are always allowed to make forward progress through it regardless of the blocking conditions on VC_A packets.

Figure 1C:
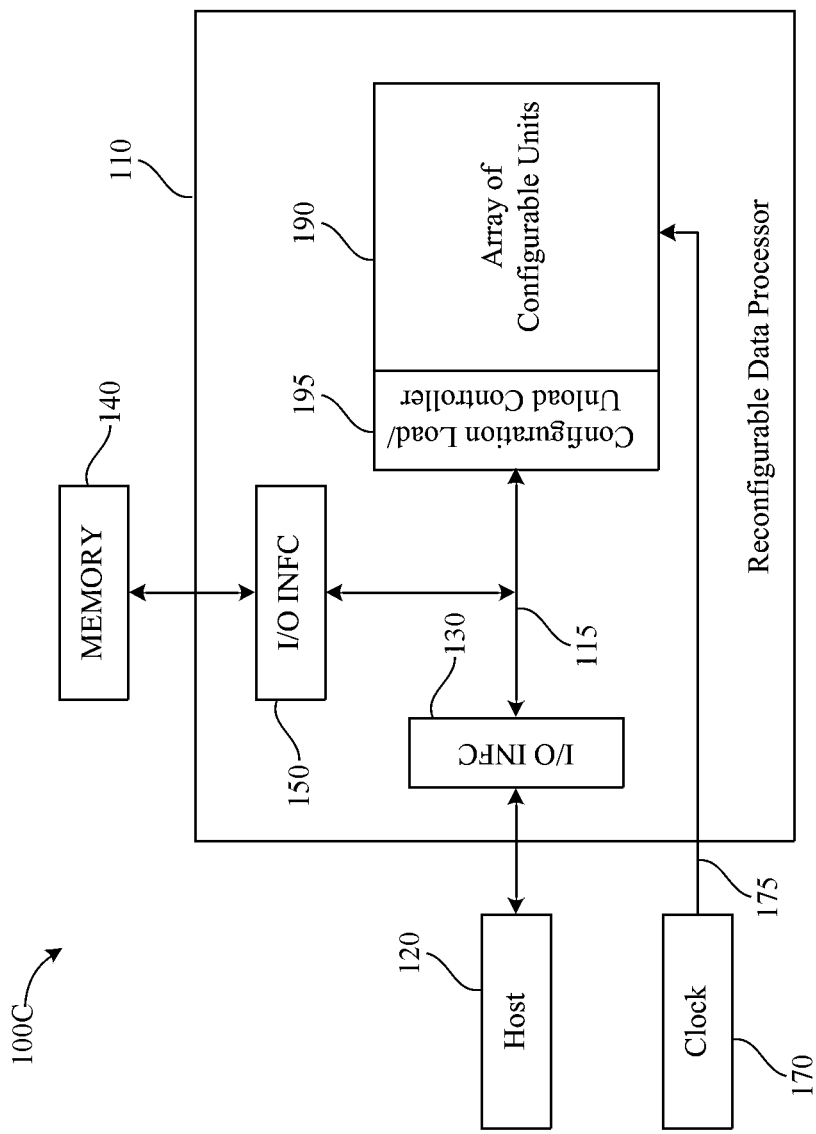
FIG. 1C is a system diagram illustrating a system including a host, a memory, and a reconfigurable data processor.

FIG. 1C is a system diagram illustrating a system 100C including a host 120, a memory 140, and a reconfigurable data processor 110. As shown in the example of FIG. 1C, the reconfigurable data processor 110 includes an array 190 of configurable units and a configuration load/unload controller 195. The phrase "configuration load/unload controller", as used herein, refers to a combination of a configuration load controller and a configuration unload controller. The configuration load controller and the configuration unload controller may be implemented using separate logic and data path resources or may be implemented using shared logic and data path resources as suits a particular embodiment. In some embodiments, a system may include only a configuration load controller of the types described herein. In some embodiments, a system may include only a configuration unload controller of the types described herein.

The processor 110 includes an external I/O interface 130 connected to the host 120, and external I/O interface 150 connected to the memory 140. The I/O interfaces 130, 150 connect via a bus system 115 to the array 190 of configurable units and to the configuration load/unload controller 195. The bus system 115 may have a bus width that carries one chunk of data, which can be for this example 128 bits (references to 128 bits throughout can be considered as an example chunk size more generally). In general, a chunk of the configuration file can have N bits of data, and the bus system can be configured to transfer N bits of data in one bus cycle, where N is any practical bus width. A sub-file distributed in the distribution sequence can consist of one chunk, or other amounts of data as suits a particular embodiment. Procedures are described herein using sub-files consisting of one chunk of data each. Of course, the technology can be configured to distribute sub-files of different sizes, including sub-files that may consist of two chunks distributed in two bus cycles for example.

To configure configurable units in the array 190 of configurable units with a configuration file, the host 120 can send the configuration file to the memory 140 via the interface 130, the bus system 115, and the interface 150 in the reconfigurable data processor 110. The configuration file can be loaded in many ways, as suits a particular architecture, including in data paths outside the configurable processor 110. The configuration file can be retrieved from the memory 140 via the memory interface 150. Chunks of the configuration file can then be sent in a distribution sequence as described herein to configurable units in the array 190 of configurable units in the reconfigurable data processor 110.

An external clock generator 170 or other clock signal sources can provide a clock signal 175 or clock signals to elements in the reconfigurable data processor 110, including the array 190 of configurable units, and the bus system 115, and the external data I/O interfaces 130 and 150.

Figure 2:
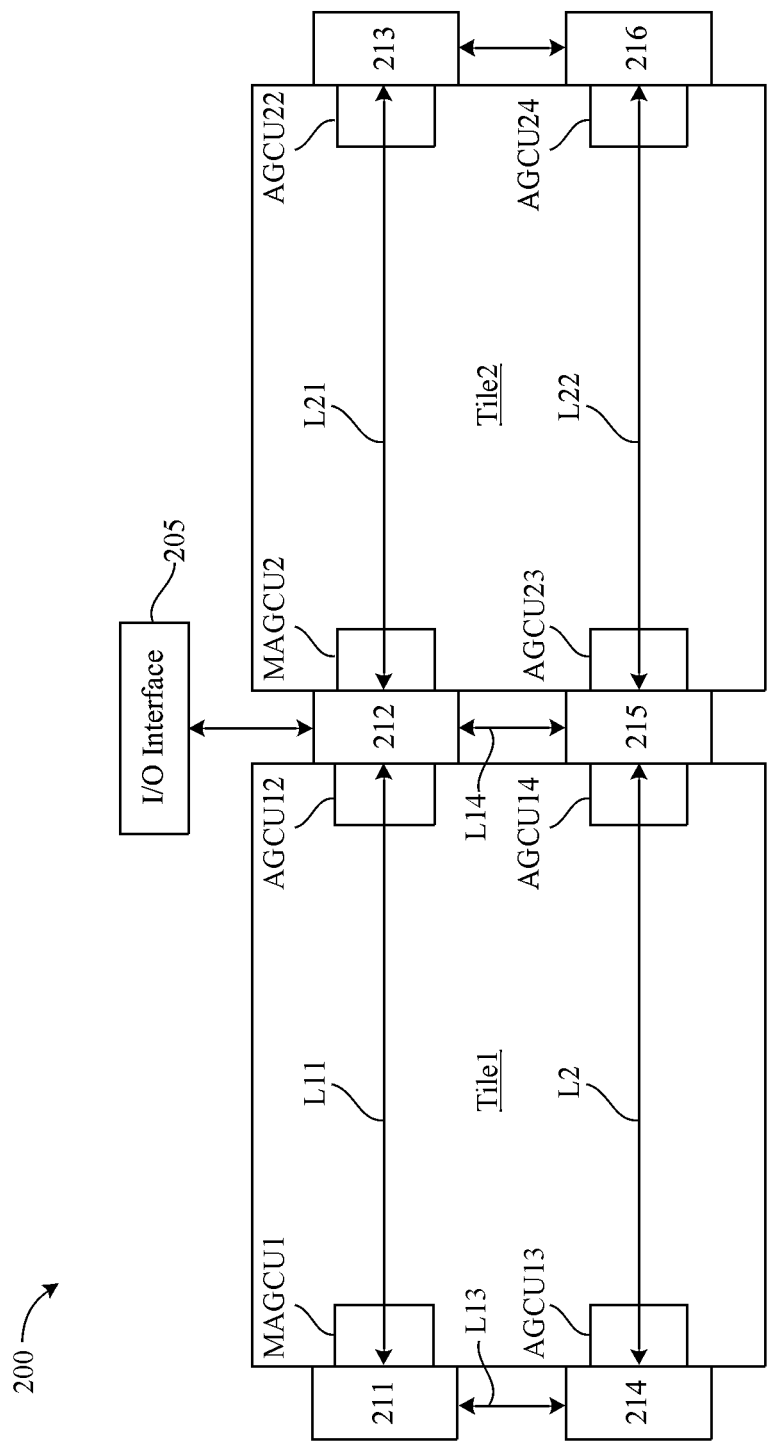
FIG. 2 is a simplified block diagram of a top-level network and components of a CGRA (Coarse Grain Reconfigurable Architecture).

FIG. 2 is a simplified block diagram of components of a CGRA (Coarse Grain Reconfigurable Architecture) processor 200. In this example, the CGRA processor 200 has 2 tiles (Tile1, Tile2). Each tile comprises an array of configurable units connected to a bus system, including an array level network (ALN) in this example. The bus system includes a top-level network connecting the tiles to external I/O interface 205 (or any number of interfaces). In other embodiments, different bus system configurations may be utilized. The configurable units in each tile are nodes on the ALN in this embodiment.

In the depicted embodiment, each of the two tiles has 4 AGCUs (Address Generation and Coalescing Units) (e.g., MAGCU1, AGCU12, AGCU13, AGCU14). The AGCUs are nodes on the top-level network and nodes on the ALNs and include resources for routing data among nodes on the top-level network and nodes on the ALN in each tile.

Nodes on the top-level network in this example include one or more external I/O, including interface 205. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented, and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configurations for more than one tile. In other embodiments, more than one configuration controller can be designed for configuration of a single tile. Also, the configuration load/unload controller can be implemented in other portions of the system, including as a stand-alone node on the top-level network and the ALN or networks.

The top-level network is constructed using top-level switches (211-216) connecting to each other as well as to other nodes on the top-level network, including the AGCUs, and I/O interface 205. The top-level network includes links (e.g., L11, L12, L21, L22) connecting the top-level switches. Data travel in packets between the top-level switches on the links, and from the switches to the nodes on the network connected to the switches. For example, top-level switches 211 and 212 are connected by a link L11, top-level switches 214 and 215 are connected by a link L12, top-level switches 211 and 214 are connected by a link L13, and top-level switches 212 and 213 are connected by a link L21. The links can include one or more buses and supporting control lines, including for example a chunk-wide bus (vector bus). For example, the top-level network can include data, request, and response channels operable in coordination for transfer of data in a manner analogous to an AXI compatible protocol. See, AMBA® AXI and ACE Protocol Specification, A R M, 2017.

Top-level switches can be connected to AGCUs. For example, top-level switches 211, 212, 214 and 215 are connected to MAGCU1, AGCU12, AGC U13 and AGCU14 in the tile Tile1, respectively. Top-level switches 212, 213, 215 and 216 are connected to MAGCU2, AGCU22, AGCU23 and AGCU24 in the tile Tile2, respectively. Top-level switches can be connected one or more external I/O interfaces (e.g., interface 205).

Figure 3B:
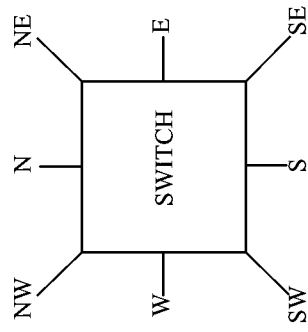
FIG. 3B illustrates an example switch unit connecting elements in an array level network.
Figure 3A:
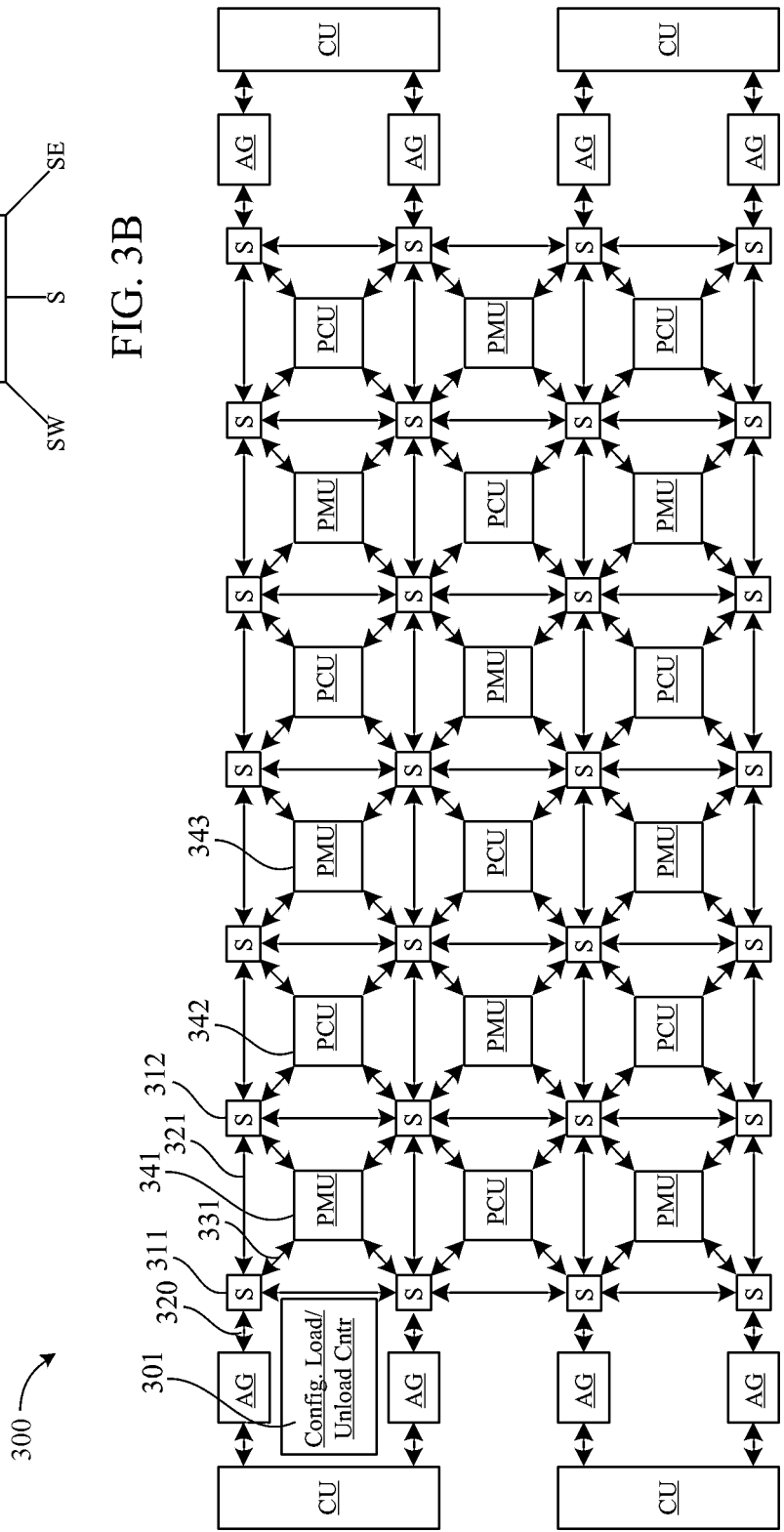
FIG. 3A is a simplified diagram of a tile and an array level network usable in the configuration of FIG. 2, where the configurable units are nodes on the array level network.

FIG. 3A is a simplified diagram of a tile and an ALN usable in the configuration of FIG. 2, where the configurable units in the array are nodes on the ALN. In this example, the array of configurable units 300 includes a plurality of types of configurable units. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces.

Additionally, each of these configurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of configurable units based on the contents of the bit file to allow all the components to execute a program (i.e., a machine). Program Load may also require the load of all PMU memories.

The ALN includes links interconnecting configurable units in the array. The links in the ALN include one or more and, in this case three, kinds of physical buses: a chunk-level vector bus (e.g. 128 bits of data), a word-level scalar bus (e.g. 32 bits of data), and a multiple bit-level control bus. For instance, interconnect 321 between switch units 311 and 312 includes a vector bus interconnect with vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicate if the chunk is scratchpad memory or configuration store data.
Bits that form a chunk number.
Bits that indicate a column identifier.
Bits that indicate a row identifier.
Bits that indicate a component identifier.

For a load operation, the configuration load controller can send N chunks to a configurable unit in order from N−1 to 0. For this example, the 6 chunks are sent out in most significant bit first order of Chunk 5→Chunk 4→Chunk 3→Chunk 2→Chunk 1→Chunk 0. (Note that this most significant bit first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 3B illustrates an example switch unit connecting elements in an ALN. As shown in the example of FIG. 3B, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the ALN.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the ALN. For instance, a chunk of configuration data in a unit file particular to a configurable unit PMU 341 can be sent from the configuration load/unload controller 301 to the PMU 341, via a link 320 between the configuration load/unload controller 301 and the West (W) vector interface of the switch unit 311, the switch unit 311, and a link 331 between the Southeast (SE) vector interface of the switch unit 311 and the PMU 341.

Figure 4:
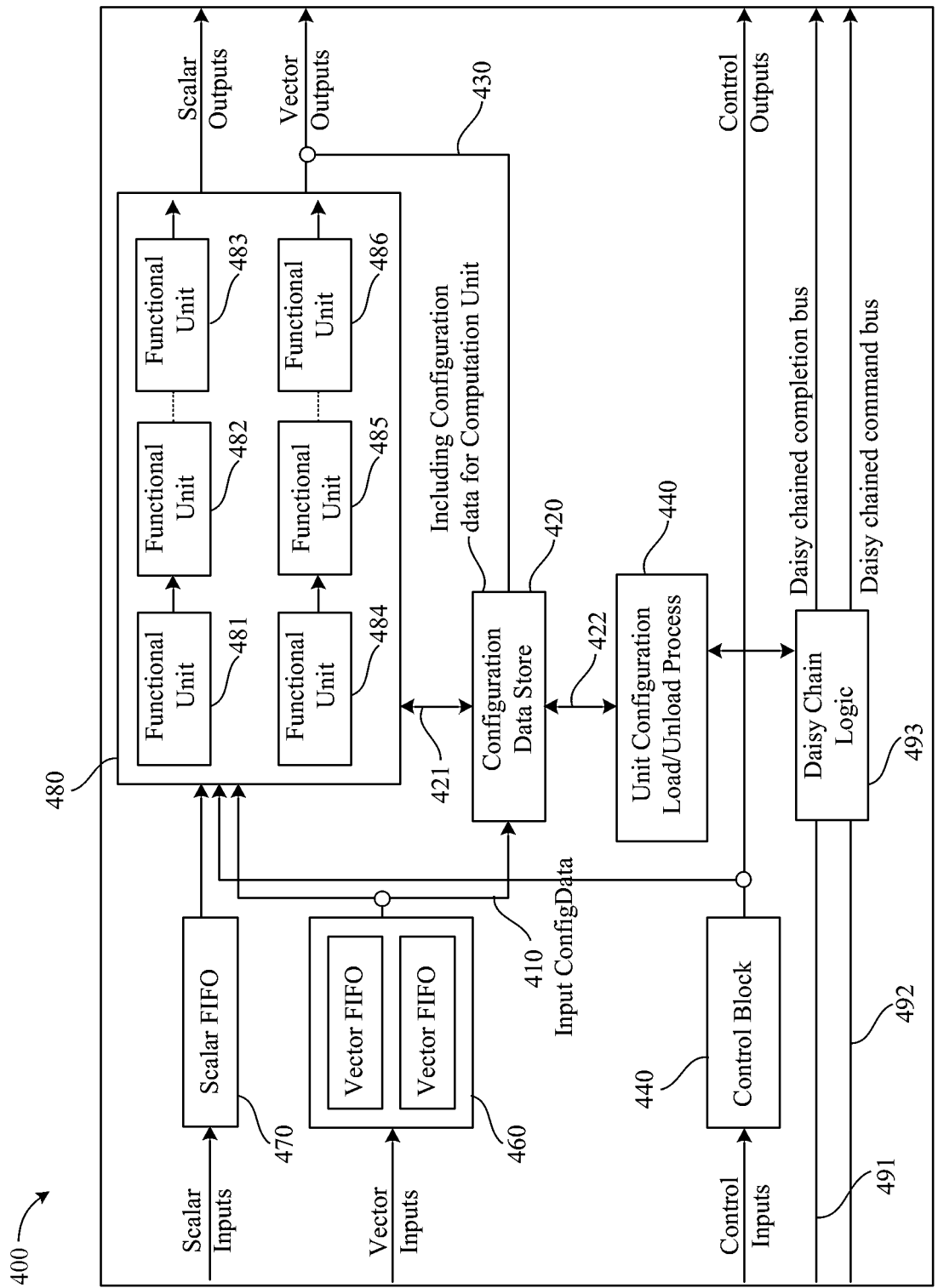
FIG. 4 is a block diagram illustrating an example configurable compute unit.

In this example, one of the AGCUs is configured to be a master AGCU, which includes a configuration load/unload controller (e.g. 301). The master AGCU implements a register through which the host (120, FIG. 1) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy chained command bus (FIG. 4). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top-level network. The data read from memory are transmitted by the master AGCU over the vector interface on the ALN to the corresponding configurable unit according to a distribution sequence described herein.

In one embodiment, in a way that can reduce the wiring requirements within a configurable unit, configuration and status registers holding unit files to be loaded in a configuration load process or unloaded in a configuration unload process in a component are connected in a serial chain and can be loaded through a process of shifting bits through the serial chain. In some embodiments, there may be more than one serial chain arranged in parallel or in series. When a configurable unit receives, for example, 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (150, FIG. 1). Each of the memory interfaces can be accessed using several AGCUs. Each AGCU contains a reconfigurable scalar datapath to generate requests for the off-chip memory. Each AGCU contains FIFOs (first-in-first-out buffers for organizing data) to buffer outgoing commands, data, and incoming responses from the off-chip memory.

The address generators AGs in the AGCUs can generate memory commands that are either dense or sparse. Dense requests can be used to bulk transfer contiguous off-chip memory regions and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

FIG. 4 is a block diagram illustrating an example configurable unit 400, such as a Pattern Compute Unit (PCU). A configurable unit can interface with the scalar, vector, and control buses, in this example using three corresponding sets of inputs and outputs: scalar inputs/outputs, vector inputs/outputs, and control inputs/outputs. Scalar IOs can be used to communicate single words of data (e.g. 32 bits). Vector IOs can be used to communicate chunks of data (e.g. 128 bits), in cases such as receiving configuration data in a unit configuration load process and transmitting and receiving data during operation after configuration across a long pipeline between multiple PCUs. Control IOs can be used to communicate signals on control lines such as the start or end of execution of a configurable unit. Control inputs are received by control block 470, and control outputs are provided by the control block 470.

Each vector input is buffered in this example using a vector FIFO in a vector FIFO block 460 which can include one or more vector FIFOs. Likewise in this example, each scalar input is buffered using a scalar FIFO 450. Using input FIFOs decouples timing between data producers and consumers and simplifies inter-configurable-unit control logic by making it robust to input delay mismatches.

A configurable unit includes multiple reconfigurable datapaths in block 480. A datapath in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each datapath in the configurable unit. The configuration serial chain in the configuration data store 420 is connected to the multiple datapaths in block 480 via line 421.

A configurable datapath organized as a multi-stage pipeline can include multiple functional units (e.g., 481, 482, 483; 484, 485, 486) at respective stages. A special functional unit SFU (e.g., 483, 486) in a configurable datapath can include a configurable module 487 that comprises sigmoid circuits and other specialized computational circuits, the combinations of which can be optimized for particular implementations. In one embodiment, a special functional unit can be at the last stage of a multi-stage pipeline and can be configured to receive an input line X from a functional unit (e.g., 482, 486) at a previous stage in a multi-stage pipeline. In some embodiments, a configurable unit like a PCU can include many sigmoid circuits, or many special functional units which are configured for use in a particular graph using configuration data.

Configurable units in the array of configurable units include configuration data stores 420 (e.g., serial chains) to store unit files comprising a plurality of chunks (or sub-files of other sizes) of configuration data particular to the corresponding configurable units. Configurable units in the array of configurable units each include unit configuration load logic 440 connected to the configuration data store 420 via line 422, to execute a unit configuration load process. The unit configuration load process includes receiving, via the bus system (e.g., the vector inputs), chunks of a unit file particular to the configurable unit and loading the received chunks into the configuration data store 420 of the configurable unit. The unit file loaded into the configuration data store 420 can include configuration data, including opcodes and routing configuration, for circuits implementing a matrix multiply as described with reference to FIGS. 6-12.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 410 can be provided to a vector FIFO as vector inputs, and then be transferred to the configuration data store 420. Output configuration data 430 can be unloaded from the configuration data store 420 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 4, a daisy-chained completion bus 491 and a daisy-chained command bus 492 are connected to daisy-chain logic 493, which communicates with the unit configuration load logic 440. The daisy-chain logic 493 can include load complete status logic, as described below. The daisy-chained completion bus is further described below. Other topologies for the command and completion buses are clearly possible but not described here.

Figure 5:
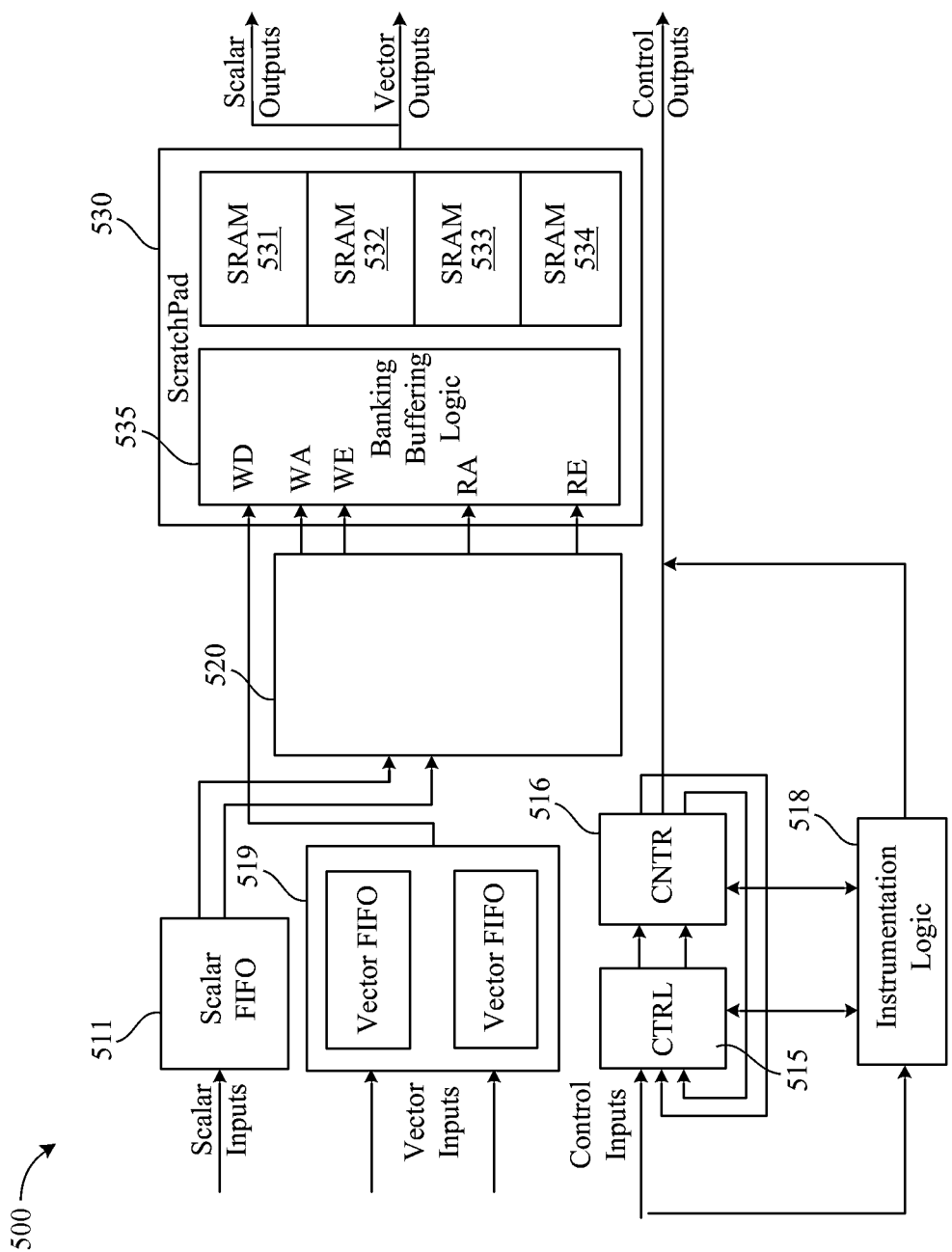
FIG. 5 is a block diagram illustrating an example configurable memory unit.

FIG. 5 is a block diagram illustrating an example configurable pattern memory unit (PMU) including an instrumentation logic unit. A PMU can contain scratchpad memory 530 coupled with a reconfigurable scalar data path 520 intended for address calculation (RA, WA) and control (WE, RE) of the scratchpad memory 530, along with the bus interfaces used in the PCU (FIG. 5). PMUs can be used to distribute on-chip memory throughout the array of reconfigurable units. In one embodiment, address calculation within the memory in the PMUs is performed on the PMU datapath, while the core computation is performed within the PCU.

The bus interfaces can include scalar inputs, vector inputs, scalar outputs and vector outputs, usable to provide write data (WD). The data path can be organized as a multi-stage reconfigurable pipeline, including stages of functional units (FUs) and associated pipeline registers (PRs) that register inputs and outputs of the functional units. PMUs can be used to store distributed on-chip memory throughout the array of reconfigurable units.

A scratchpad is built with multiple SRAM banks (e.g., 531, 532, 533, 534). Banking and buffering logic 535 for the SRAM banks in the scratchpad can be configured to operate in several banking modes to support various access patterns. A computation unit as described herein can include a lookup table stored in the scratchpad memory 530, from a configuration file or from other sources. In a computation unit as described herein, the scalar data path 520 can translate a section of a raw input value I for addressing lookup tables implementing a function f(I), into the addressing format utilized by the SRAM scratchpad memory 530, adding appropriate offsets and so on, to read the entries of the lookup table stored in the scratchpad memory 530 using the sections of the input value I. Each PMU can include write address calculation logic and read address calculation logic that provide write address WA, write enable WE, read address RA and read enable RE to the banking buffering logic 535. Based on the state of the local FIFOs 511 and 519 and external control inputs, the control block 515 can be configured to trigger the write address computation, read address computation, or both, by enabling the appropriate counters 516. A programmable counter chain 516 (Control Inputs, Control Outputs) and control block 515 can trigger PMU execution.

Instrumentation logic 518 is included in this example of a configurable unit. The instrumentation logic 518 can be part of the control block 515 or implemented as a separate block on the device. The instrumentation logic 518 is coupled to the control inputs and to the control outputs. Also, the instrumentation logic 518 is coupled to the control block 515 and the counter chain 516, for exchanging status signals and control signals in support of a control barrier network configured as discussed above.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

Figure 6A:
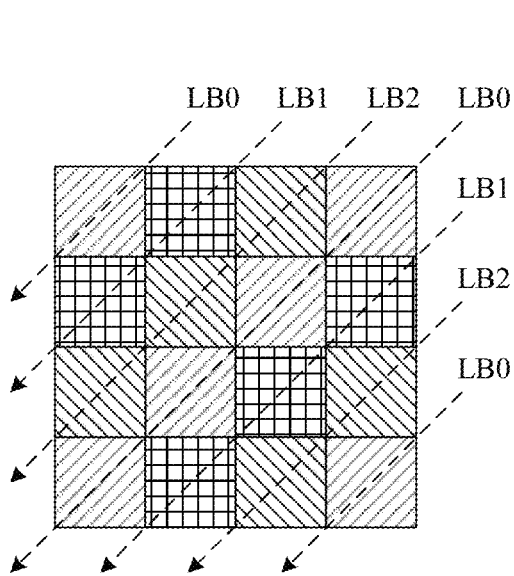
FIG. 6A and FIG. 6B illustrate two classes of memory unit partitioning in accordance with embodiments disclosed herein.
Figure 6B:
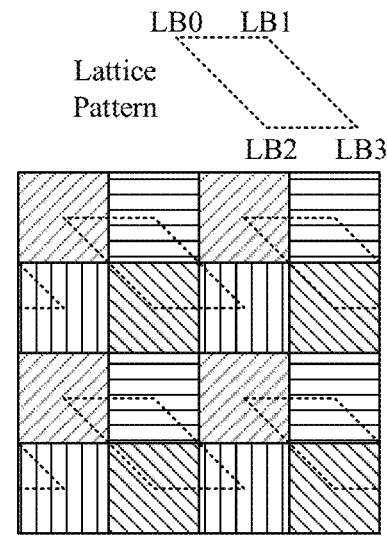

FIG. 6A and FIG. 6B illustrate two classes of memory unit partitioning in accordance with embodiments disclosed herein. Memory unit partitioning enables concurrent access to memory units (as well as concurrent processing by compute units) and simplifies the conversion of logical memory indexing to physical memory addresses. As depicted, FIG. 6A illustrates one example of 2D hyperplane partitioning and FIG. 6B illustrates one example of 2D lattice (parallelepiped) partitioning. The embodiments disclosed herein support both classes of memory unit partitioning including higher-dimensional (e.g., 3D or 4D hyperplane partitioning) partitioning which is not shown in FIGS. 6A and 6B.

Figure 7:
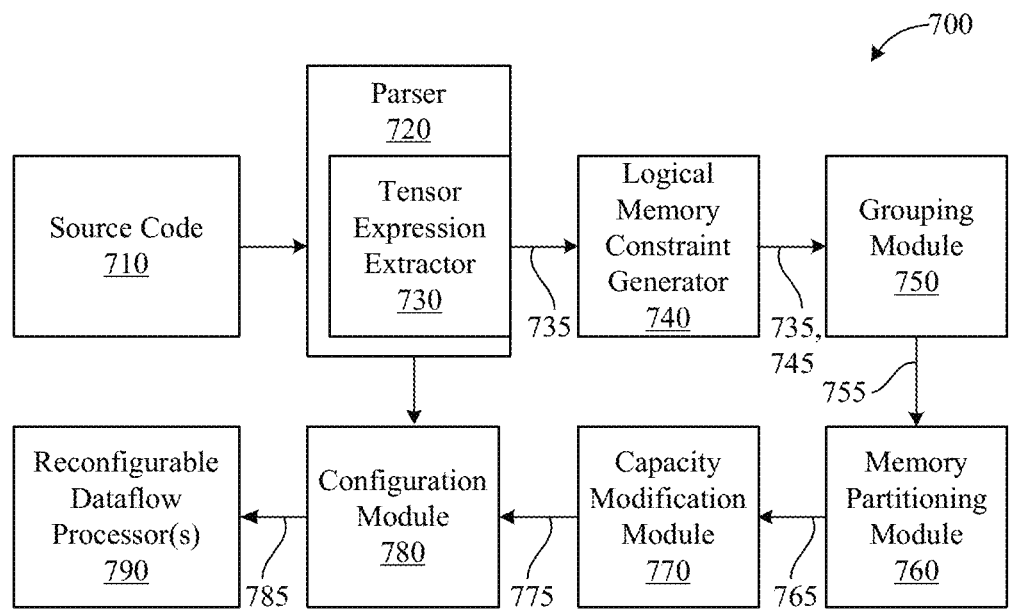
FIG. 7 is a block diagram depicting one example of a system for determining and using memory unit partitioning solutions.

FIG. 7 is a block diagram depicting one example of a system 700 for determining and using memory unit partitioning solutions. As depicted, the system 700 includes a parser 720, a logical memory constraint generator 740, a grouping module 750, a memory partitioning module 760, a capacity modification module 770, a configuration module 780 and one or more reconfigurable dataflow processors 790. The system 700 enables determination of viable memory partitioning solutions and execution of a selected solution on the reconfigurable dataflow processors 790. Some of the modules of the system 700 (e.g., 740-770) may be implemented within the template library stack 40.

The parser 720, parses the statements of the source code 710. In some embodiments, the parser generates a high-level compute graph where the nodes of the compute graph correspond to expressions including tensor indexing expressions. The high-level compute graph may indicate dependencies between expressions and/or operations. The tensor expression extractor 730 may extract tensor indexing expressions 735 from the source code of an app intended for the reconfigurable dataflow processors 790.

The logical memory constraint generator 740 may generate logical memory constraints 745 that indicate the memory indexing constraints of various indexing variables. See FIG. 13B for an example of constraint statements 1320 that define logical memory constraints 745.

The grouping module 750 may determine dependencies for the tensor indexing expressions 735 and group together the corresponding memory indexing constraints 745 into groups 755 that are not dependent on each other and can be concurrently executed. In one embodiment, the high-level compute graph is traversed to determine such dependencies.

The memory partitioning module 760 may determine a memory partitioning (banking) scheme 765 that best satisfies user-specified criteria with the fewest required virtual resources. The capacity modification module 770 may increase the capacity of a selected memory partitioning scheme and provide a modified memory partition scheme 775 to meet the performance objectives of a user and/or ensure that a tensor fits within the physical memory units to which it is assigned. For example, the number of logical memory units (N) that a tensor is partitioned into, and the number of memory units assigned to a tensor may be increased so that the assigned physical capacity exceeds the required storage size for the tensor.

The configuration module 780 may provide configuration data 785 to configure configurable elements of the reconfigurable dataflow processor(s) [which are not shown in FIG. 7] such as memory units, compute units and communication elements of a switching fabric. For example, the memory units may be configured according to the memory partitioning (banking) scheme determined by the memory partitioning module 760. Once configured, the reconfigurable dataflow processors 790 may (repetitively) conduct dataflow operations on tensor data.

As shown in other Figures and described elsewhere in this specification, each reconfigurable dataflow processor (or RDU) 790 may comprise an array of compute units and an array of memory units interconnected with a switching fabric. Furthermore, the memory units may comprise address generators that generate, for each memory cycle, a physical address comprising a bank identifier and a bank offset. Each memory unit may be configured to respond only to memory cycles that generate a bank identifier that has been assigned to that memory unit. The bank identifier and bank offset may be generated using a memory partitioning (banking) scheme determined by the memory partitioning module 760. Each memory unit may be configured to respond to a specific assigned bank identifier. Consequently, a memory unit that generates a bank identifier and a bank offset may ignore the generated address and any operation associated therewith if the generated bank identifier does not match the assigned bank identifier.

Figures 8, 9:
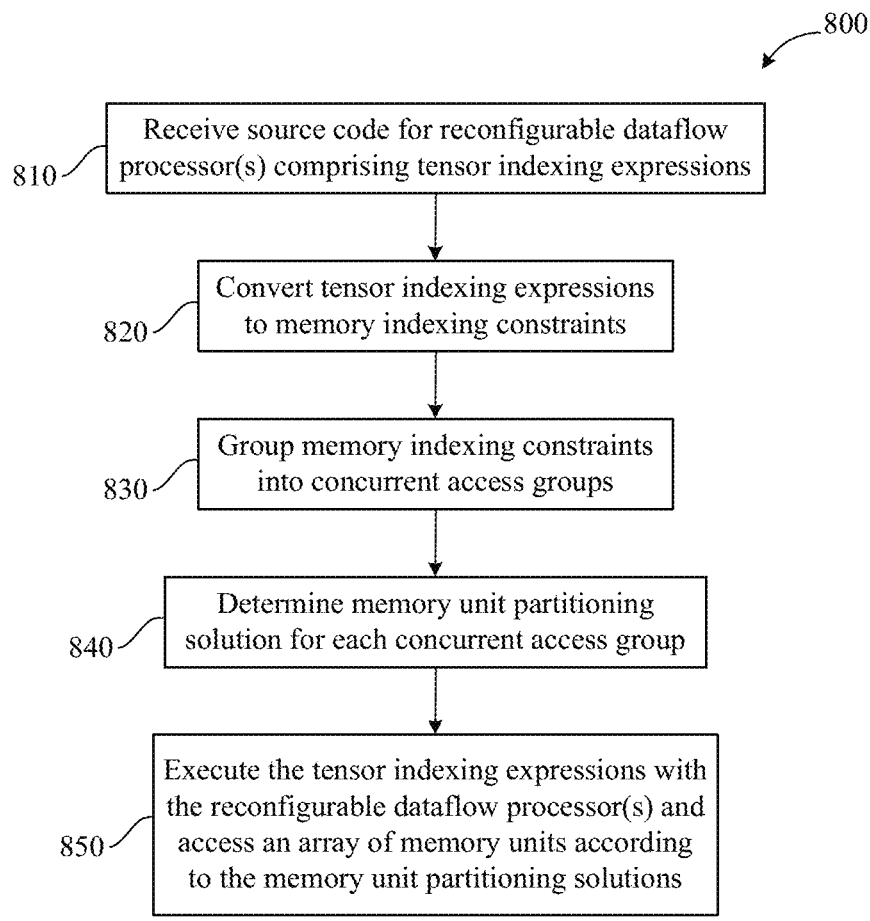
FIG. 8 is a flowchart depicting one example of a method for determining and using memory unit partitioning solutions.
FIG. 9 shows one example of a set of logical-to-physical address mapping equations.

FIG. 8 is a flowchart depicting one example of a method 800 for determining and using memory unit partitioning solutions. As depicted, the method 800 includes receiving (810) source code, converting (820) tensor indexing expressions 735 to memory indexing constraints 745, grouping (830) memory indexing constraints into concurrent access groups, determining (840) one or more memory unit partitioning solutions 765/775, and executing (850) the tensor indexing expressions. The depicted method may be conducted by the system 700 or the like.

Receiving (810) source code may include receiving source code for a reconfigurable dataflow computing system. The source code may be for highly mathematical applications such as machine learning, AI or scientific computing. The source code may largely comprise tensor related expressions.

Converting (820) tensor indexing expressions to memory indexing constraints may include using a parser to detect and extract sets of tensor indexing expressions. The tensor indexing expressions may define the indexing operations for tensor variables. Once extracted the tensor indexing expressions may be converted to memory indexing constraints. FIGS. 13A-13B show at least one example of tensor indexing constraint statements 1320 and the corresponding tensor indexing expressions 1310 from which they are derived.

Grouping (830) memory indexing constraints into concurrent access groups may include determining dependencies for the tensor indexing expressions and grouping together the corresponding memory indexing constraints that are not dependent on each other and can be concurrently executed. In one embodiment, an operation graph corresponding to the source code is traversed to determine which tensor indexing expressions and corresponding dependencies can be grouped into concurrent access groups.

Determining (840) one or more memory unit partitioning solutions may include generating a set of possible solutions and selecting the solution that best satisfies specific criteria for the application and/or the computing system. In one embodiment, determining the memory unit partitioning solution comprises using a set of logical-to-physical address mapping equations, determining legal combinations of a set of logical-to-physical mapping parameters for the mapping equations and selecting a legal combination that best satisfies selection criteria for the memory unit partitioning solution. In conjunction with the determining step 840, capacity modification may be performed to legalize a memory unit partitioning solution.

Executing (850) the tensor indexing expressions may include configuring one or more dataflow processors and the compute units and memory units associated therewith. Subsequent to configuration, the dataflow processors may execute dataflow operations corresponding to the source code and the tensor indexing expressions included therein.

FIG. 9 shows one example of a set of logical-to-physical address mapping equations. The depicted example includes a bank address (i.e., identifier) equation 910 that determines a bank address BA and a bank offset (i.e., index) equation 920 that determines a bank offset BO. The input parameters for the equations include a logical memory unit (e.g., hyperplane) count N, a logical location vector x, a location scaling vector alpha, a blocking parameter B, a dimension (logical indexing) length vector D, and a packing vector P. The mapping equations 910 and 920 may be used by method 800 (and method 1000 below) to select a memory unit partitioning solution.

One of skill in the art will appreciate that the roles of the various mapping equation parameters are interdependent and are best determined from analyzing and using the equations themselves. However, for those that may not be familiar with such (vector-based) equations, the following description and definitions may serve as a starting point for comprehension:

N—the number of banks (i.e., logical memory units).
B—the blocking factor. Enables blocking together certain adjacent logical addresses so that they map to the same bank address BA. May produce a non-linear BA pattern, since it is used as the denominator of floor-division.
alpha—the location scaling factor. If B=1, this represents how many virtual hyperplanes (logical memory units) to advance between adjacent logical addresses on a particular dimension. If B !=1, then this relationship is more complicated.
P is the packing vector. It represents the shape of a tessellating neighborhood where all x in that neighborhood are within B physical addresses of each other.

The above parameters are used to convert a logical address, x, to BA (bank address) and BO (intra-bank offset). The banking equation BA works by taking the inner product between x and alpha, and dividing this value by B. This can be interpreted as a "virtual bank" and is a nonnegative integer. Then, this virtual bank is converted to BA (i.e., the logical bank address) by applying modulo N. The intra-bank offset equation BO maps a logical address to a physical address relative to the origin on its bank, BA. It works by pooling the entire logical memory space with neighborhoods of shape P. Each neighborhood maps to physical addresses in every BA of B*k to B*(k+1), where k is the "flat index" of the particular neighborhood. BO is calculated by determining which neighborhood x resides in, then flattening this to determine the neighborhood's flat identifier, and adding an offset based on where within the neighborhood x exists (if B>1).

Figure 10A:
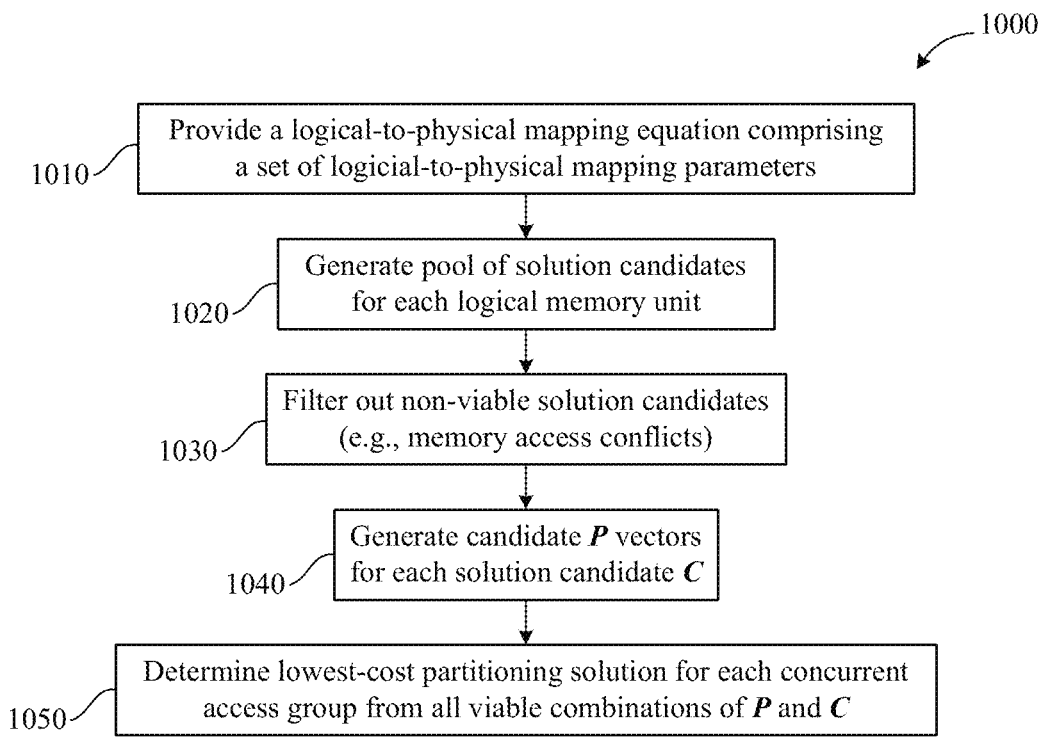
FIG. 10A is a flowchart depicting one example of a partitioning solution optimization method.

FIG. 10A is a flowchart depicting one example of a partitioning solution optimization method 1000. As depicted, the partitioning solution optimization method 1000 includes providing (1010) logical-to-physical mapping equations, generating (1020) a pool of solution candidates, filtering out (1030) non-viable solution candidates, generating (1040) candidate P vectors and determining (1050) a lowest-cost partitioning solution. The partitioning solution optimization method 1000 is one example of the determining step 840 within the method 800 and may be conducted before configuring one or more reconfigurable dataflow processors to execute the tensor indexing expressions 735 and other expressions defined by the source code 710.

Providing (1010) logical-to-physical mapping equations may include providing a bank address (i.e., identifier) equation and a bank offset (i.e., index) equation such as those shown in FIG. 9. The equations may have a set of input parameters such as a logical memory unit count N, a blocking parameter B, and a scaling vector alpha ($\alpha$). In some embodiments, a validity range for each of the input parameters is provided along with the logical-to-physical mapping equations.

Generating (1020) a pool of solution candidates may include receiving a set of permissible parameter values, or value ranges for parameters, used in the logical-to-physical mapping equations. In one embodiment, a solution candidate is generated for each combination of permissible parameter values for N, B and alpha. Filtering out (1030) solution candidates may include eliminating solutions corresponding to non-viable or unpromising combinations of parameter values. For example, a concurrent access group may require support for 4 read operations concurrent with 2 write operations. Solution candidates that are unable to support 4 read operations concurrent with 2 write operations would be eliminated from further consideration.

Generating (1040) candidate P vectors may include generating viable packing vectors P for each solution candidate. Determining (1050) a lowest-cost partitioning solution may include comparing cost estimates for all P vectors associated with each solution candidate C of a concurrent access group and selecting the combination of P and C with the lowest cost. The cost estimates may be based on a heuristic or on a cost model derived from previous solutions.

It should be noted that when hyperplane partitioning is unable to provide a sufficient banking/partitioning solution, an n-dimensional tensor and its accesses can be projected into n different, one-dimensional accesses on a one-dimensional tensor. Each dimension may be banked independently of the others. Such a solution is a "multidimensional" banking scheme, in which one bank address BA is calculated per-dimension, and a single bank offset BO is calculated as a physical offset into the n-dimensional bank.

Figure 10B:
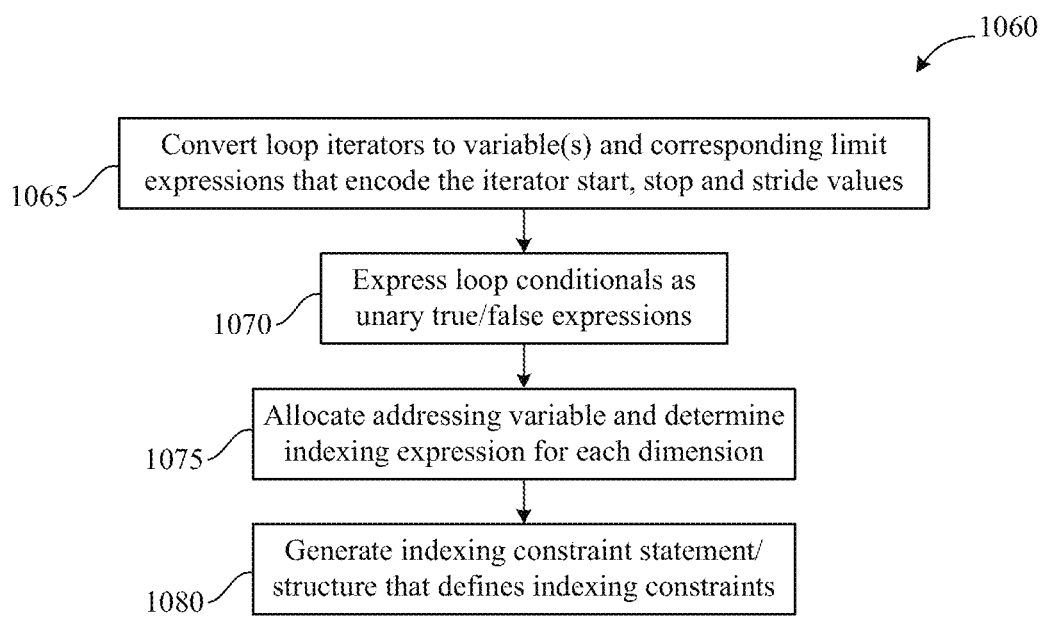
FIG. 10B is a flowchart depicting one example of an indexing constraints generation method.

FIG. 10B is a flowchart depicting one example of an indexing constraints generation method 1060 and FIG. 10C shows one example of pseudo-code processed according to the depicted method. Referring to both Figures, the method begins by converting (1065) loop iterators of a tensor indexing expression to variables and corresponding limit expressions that encode (i.e., capture) the iterator start, stop and stride values. For example, the tensor indexing expression 1090 includes iterator variables 'i' and 'j' which are captured in the limit expressions 1092 along with their start, stop and stride values. In the depicted example, the start and stop values for iterator variable 'i' are 0 and 10 respectively while the start and stop values for iterator variable T are 1 and 10 respectively. Furthermore, iterator variable 'i' has a stride value of 1 which, as an assumed default, need not be specified in the expressions 1092. In contrast, iterator variable 'j' has a stride value of two which is specified via an expression that uses a dummy variable j Subsequent to step 1065, the method continues by expressing (1070) loop conditionals as unary true/false expressions 1094. In the depicted example, the unary true/false expressions 1094 are 'i<5' and 'j<5'. Subsequently, the method continues by allocating (1075) addressing variables and determining a dimension indexing expression 1096 for each dimension. In the depicted example, the allocated addressing variables are 'dim0' and 'dim1' and the dimension indexing expressions 1096 are 'dim0=2*i' and 'dim1=j-1', respectively. The method 1060 continues by generating (1080) an indexing constraint statement or structure. In the depicted example of FIG. 10C, an indexing constraint statement 1098 is generated. The indexing constraint statement/structure may be a compound statement/structure that incorporates each of the elements generated by the method in previous steps. For example, the indexing constraint statement 1098 incorporates the limit expressions 1092, the unary true/false expressions 1094 and the dimension indexing expressions 1096 into a compound (i.e., Boolean) indexing constraint statement.

Figures 11A, 11B, 11C:
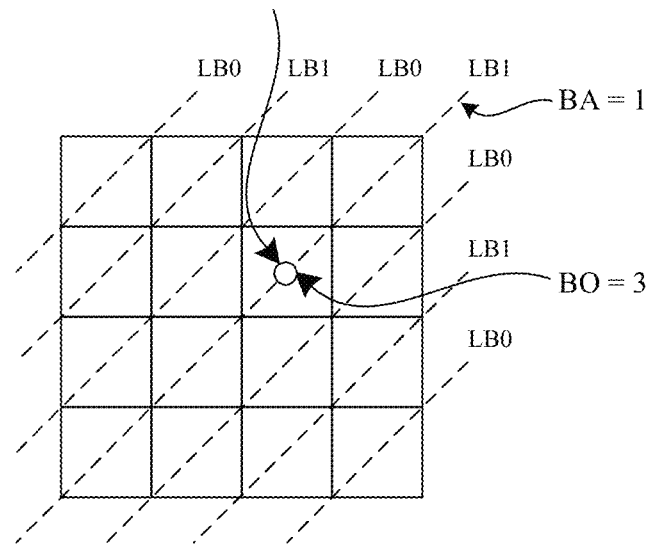
FIG. 11A shows one example of mapping a logical address to a physical address for a memory partitioning solution.
FIG. 11B shows a simplified example of computing a bank address for each logical address of the example 2D array of FIG. 11A.
FIG. 11C shows a simplified example of computing a bank offset for each logical address of the example 2D array of FIG. 11A.

FIG. 11A-11C show one example of mapping a logical address to a physical address for a hyperplane memory partitioning solution of a 2D array. The depicted solution comprises two logical banks or hyperplanes labeled 'LB0' and 'LB1'. A 2D logical address of [1,2] is shown being mapped to logical bank address/identifier '1' (BA=1) with a bank offset of '3' (BO=3). One of skill in the art will recognize that in the depicted example logical bank '0' stores data for logical addresses [0,0], [0,2], [1,1], [1,3], [2,0], [2,2], [3,1] and [3,3], and logical bank '1' stores data for logical addresses [0,1], [0,3], [1,0], [1,2], [2,1], [2,3], [3,0] and [3,2].

In the depicted example, a partitioning solution may be found where the bank address BA can be computed by summing the row and column indexes modulo N namely BA=(R+C) MOD N=(R+C)&0×01 as shown in FIG. 11B. Furthermore, the bank offset can be computed with the formula BO=(2*R+C)/N=R+R+(C>1) as shown in FIG. 11C. One of skill in the art will appreciate that the depicted formulas are simplified versions of the logical-to-physical address mapping equations shown in FIG. 9 that avoid division and modulo operations that may not be supported by the address generators of a memory unit or the like. One of skill in the art will also appreciate that some tensor sizes may not be supportable by the address generators of the memory units. In such situations, tensor padding may be used to provide a solution that can be supported with the simplified address generation available to the memory units.

FIG. 12A and FIG. 12B illustrate one example of pseudo-code corresponding to portions of the methods 800 and 1000 depicted in FIGS. 8 and 10A respectively. The depicted pseudocode includes a 'generate_solution_candidates' function, a 'form_access_groups' function, a 'check_for_conflicts' function, a 'find_valid_solutions' function and a 'select_solution' function. The depicted functions can be used to build a partitioning solution for a specific set of tensor indexing expressions within source code for a reconfigurable dataflow computing system.

The 'generate_solution_candidates' function receives a set of candidate parameter values for parameters used in a set of logical-to-physical mapping equations such as the logical-to-physical mapping equations shown in FIG. 9. In the depicted example those candidate parameter values include candidate values for the N, B and alpha parameters. The parameter candidate values are used to build a vector of 'possible Solutions' that is returned to the invoking function. In the depicted example, a 'preliminary checks ok' function runs a set of heuristics to prune the number of possible solutions. For example, solutions that are redundant or with inaccessible memory units can be pruned and not included in the vector of 'possibleSolutions'.

The 'form_access_groups' function may determine dependencies for the tensor indexing expressions and group together the corresponding memory indexing constraints that are not dependent on each other and consequently can be concurrently executed. The 'check_for_conflicts' function may check each possible pair of memory indexing constraints and determine if the number of possible resource conflicts for that pair of memory indexing constraints is acceptable. In the depicted embodiment, dual-ported memory units are assumed. Consequently, a single potential conflict corresponds to an acceptable partitioning solution. The 'find_valid_solutions' function uses the 'check_for_conflicts' function to filter out invalid solution candidates and returns a set of 'valid_solutions'. The 'select_solution' function iterates through the set of 'valid_solutions', determines the solution cost for each P value and selects the lowest cost solution.

FIGS. 13A-D illustrate an example of tensor indexing expressions at various stages of processing in accordance with methods disclosed herein. As shown in FIG. 13A (while also referring to FIG. 7), the tensor expression extractor 730 (depicted in FIG. 7) may extract tensor indexing expressions 1310 (735 in FIG. 7) from the source code of an app intended for a reconfigurable dataflow computing system. As shown in FIG. 13B, the extracted tensor indexing expressions may be converted to tensor indexing constraint statements 1320 that define the logical memory indexing constraints 745 (for a tensor) generated by the logical memory constraint generator 740 shown in FIG. 7. In the depicted embodiment, each tensor indexing constraint statement 1320 specifies the relationship between indexing variables used in the tensor indexing expressions 1310 and assigns the relationship to a tensor label.

As shown in FIG. 13C, the tensor indexing constraint statements 1320 may be placed into access groups that indicate which tensors can be concurrently accessed. In the depicted embodiment, the tensor label 'W0' is placed into 'Group0' and tensor labels 'R0' and 'R1' are placed into 'Group1'. As shown in FIG. 13D, candidate partitioning solutions (schemes) may be generated and tested for fitness. In the depicted embodiment, the only valid partitioning solution corresponds to mapping parameter values of N=2, B=16 and alpha=1,0.

The systems and methods disclosed herein enable determining and using memory unit partitioning solutions for reconfigurable dataflow computing systems. As an example, assume a user declares a 128×128×128 tensor and some operations that read and write to the tensor. The memory partitioning module 760 may determine that the lowest cost partitioning solution corresponds to N=4, B=1 and alpha=1, 0,0. Consequently, each virtual memory unit in the partitioning solution corresponds to 128*128*128/4=524288 words. However, assume that a physical memory unit can only hold 262144 words. To address this situation the capacity modification module 770 may increase N and transform the partitioning solution to N=8, B=1, alpha=1,0, 0, so that each physical memory unit need only store 128*128*128/8=262144 words. Consequently, by performing capacity modification the tensor fits within the assigned physical memory units.

FIG. 14 illustrates an example of tensor vectorization in accordance with the systems and methods disclosed herein. A user or a compiler may specify that a tensor indexing expression uses vectorized indexing. Consequently, the number of loops performed to compute the indexing expression may be reduced by a factor of L where L is the vectorization length. In the depicted example, where the vectorization length is 4, the tensor indexing expression need only loop for 4 iterations instead of 16 iterations. When tensor vectorization is used, the partitioning systems and methods disclosed herein may operate on vectors and effectively compress the logical memory for the tensor by a factor of L when determining a memory unit partitioning solution. However, in such situations the L addresses generated by the logical-to-physical address mapping equations for each iteration are required to reference the same physical memory unit.

FIG. 15 illustrates tensor indexing expression refactoring to simplify logical-to-physical address mapping in accordance with the systems and methods disclosed herein. In some embodiments, the address generators for a memory unit may not be able to conduct modulo operations or division operations. The restriction on modulo operations and division operations may significantly reduce the complexity of the address generators and enable the placement of additional resources such as compute units and memory units on a reconfigurable dataflow processor (e.g., RDU). In those situations, tensor indexing expressions may be modified/refactored to use indexing variables that eliminate the need for those operations when computing bank addresses BA and bank offsets BO.

The embodiments disclosed herein include a system for determining and using memory unit partitioning solutions for reconfigurable dataflow computing systems, the system comprising:
  a parser configured to receive and parse source code for a reconfigurable dataflow processor comprising an array of compute units and an array of memory units interconnected with a switching fabric, the source code comprising a plurality of tensor indexing expressions
  a tensor expression extractor configured to extract the plurality of tensor indexing expressions from the source code
  a logical memory constraint generator configured to convert the plurality of tensor indexing expressions to a plurality of logical memory indexing constraints
  a grouping module configured to group the plurality of logical memory indexing constraints into concurrent access groups
  a memory partitioning module configured to determine a memory unit partitioning solution for each concurrent access group that supports the plurality of logical memory indexing constraints without concurrent usage conflicts including memory unit and memory port conflicts
  a reconfigurable dataflow processor configured to execute the plurality of tensor indexing expressions and access the array of memory units according to the memory unit partitioning solution
  Optional features for the above system include:
  wherein the memory units comprise address generators that generate, for each memory cycle, a physical address comprising a bank identifier and a bank offset
    wherein the memory units are configured to respond to a specific bank identifier
  wherein the memory partitioning module is further configured to determine the memory unit partitioning solution by selecting a set of logical-to-physical mapping parameters
    wherein the set of logical-to-physical mapping parameters comprise a logical memory unit count N, a blocking parameter B, a scaling vector alpha and a physical offset parameter P
      wherein selecting comprises testing legal combinations of N, B and alpha
    wherein the logical-to-physical mapping parameters define a hyperplane partitioning
    wherein the logical-to-physical mapping parameters define a parallelepiped partitioning a capacity modification module configured to perform a capacity modification to legalize the memory unit partitioning solution
   wherein the capacity modification comprises increasing the logical memory unit count N
      wherein the capacity modification comprises scaling P
a configuration module configured to generate configuration data for the reconfigurable dataflow processor corresponding to the memory unit partitioning solution The embodiments disclosed herein include a method for determining and using memory unit partitioning solutions for reconfigurable dataflow computing systems, the method comprising:
  receiving source code for a reconfigurable dataflow processor comprising an array of compute units and an array of memory units interconnected with a switching fabric, the source code comprising a plurality of tensor indexing expressions
  converting the plurality of tensor indexing expressions to a plurality of logical memory indexing constraints
  grouping the plurality of logical memory indexing constraints into concurrent access groups
  determining a memory unit partitioning solution for each concurrent access group that supports the plurality of logical memory indexing constraints without concurrent usage conflicts including memory unit and memory port conflicts
  accessing the array of memory units according to the memory unit partitioning solution in conjunction with executing the plurality of tensor indexing expressions with the reconfigurable dataflow processor Optional features for the above method include:
  wherein the memory units comprise address generators that generate, for each memory cycle, a physical address comprising a bank identifier and a bank offset
    wherein the memory units are configured to respond to a specific bank identifier
  wherein determining the memory unit partitioning solution comprises selecting a set of logical-to-physical mapping parameters
    wherein the set of logical-to-physical mapping parameters comprise a logical memory unit count N, a blocking parameter B, a scaling vector alpha and a physical offset parameter P
      wherein selecting comprises testing legal combinations of IV, B and alpha
    wherein the logical-to-physical mapping parameters define a hyperplane partitioning
    wherein the logical-to-physical mapping parameters define a parallelepiped partitioning
  performing a capacity modification to legalize the memory unit partitioning solution
    wherein the capacity modification comprises increasing the logical memory unit count N
      wherein the capacity modification comprises scaling P
  wherein the memory unit partitioning solution satisfies a bandwidth requirement for a tensor
    wherein the bandwidth requirement corresponds to a concurrent indexing count for the tensor
  generating configuration data for the reconfigurable dataflow processor corresponding to the memory unit partitioning solution
  configuring the reconfigurable dataflow processor using the configuration data Referring again to (at least) FIG. 4 and as will be appreciated by those of ordinary skill in the art, aspects of the various embodiments described herein may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as an "apparatus," "circuit," "circuitry," "module," "computer," "logic," "FPGA," "unit," "system," or other terms. Furthermore, aspects of the various embodiments may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic. The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

We claim as follows:

1. A system for determining and using memory unit partitioning solutions for reconfigurable dataflow computing systems, the system comprising:
   a parser configured to receive and parse source code for a reconfigurable dataflow processor that comprises an array of compute units and an array of memory units interconnected with a switching fabric, the source code comprising a plurality of tensor indexing expressions;
   a tensor expression extractor configured to extract the plurality of tensor indexing expressions from the source code;
   a logical memory constraint generator configured to convert the plurality of tensor indexing expressions to a plurality of logical memory indexing constraints;
   a grouping module configured to group the plurality of logical memory indexing constraints into concurrent access groups;
   a memory partitioning module configured to determine a memory unit partitioning solution for each concurrent access group that supports the plurality of logical memory indexing constraints without concurrent usage conflicts including memory unit and memory port conflicts; and
   reconfigurable dataflow processor configured to execute the plurality of tensor indexing expressions and access the array of memory units according to the memory unit partitioning solution;
   wherein memory units in the array of memory units comprise address generators that generate, for each memory cycle, a physical address comprising a bank identifier and a bank offset;
   wherein said memory units in the array of memory units are configured to respond to a specific bank identifier;
   wherein the memory partitioning module is further configured to determine the memory unit partitioning solution by selecting a set of logical-to-physical mapping parameters; and
   wherein the set of logical-to-physical mapping parameters comprise a logical memory unit count N, a blocking parameter B, a scaling vector alpha and a packing vector P.

2. A system for determining and using memory unit partitioning solutions for reconfigurable dataflow computing systems, the system comprising:
   a parser configured to receive and parse source code for a reconfigurable dataflow processor that comprises an array of compute units and an array of memory units interconnected with a switching fabric, the source code comprising a plurality of tensor indexing expressions;
   a tensor expression extractor configured to extract the plurality of tensor indexing expressions from the source code;
   a logical memory constraint generator configured to convert the plurality of tensor indexing expressions to a plurality of logical memory indexing constraints;
   a grouping module configured to group the plurality of logical memory indexing constraints into concurrent access groups;
   a memory partitioning module configured to determine a memory unit partitioning solution for each concurrent access group that supports the plurality of logical memory indexing constraints without concurrent usage conflicts including memory unit and memory port conflicts; and
   reconfigurable dataflow processor configured to execute the plurality of tensor indexing expressions and access the array of memory units according to the memory unit partitioning solution;
   wherein memory units in the array of memory units comprise address generators that generate, for each memory cycle, a physical address comprising a bank identifier and a bank offset;
   wherein said memory units in the array of memory units are configured to respond to a specific bank identifier;
   wherein the memory partitioning module is further configured to determine the memory unit partitioning solution by selecting a set of logical-to-physical mapping parameters;
   wherein the set of logical-to-physical mapping parameters comprise a logical memory unit count N, a blocking parameter B, a scaling vector alpha and a packing vector P; and
   wherein selecting comprises testing legal combinations of N, B and alpha.

3. A system for determining and using memory unit partitioning solutions for reconfigurable dataflow computing systems, the system comprising:
   a parser configured to receive and parse source code for a reconfigurable dataflow processor that comprises an array of compute units and an array of memory units interconnected with a switching fabric, the source code comprising a plurality of tensor indexing expressions;
   a tensor expression extractor configured to extract the plurality of tensor indexing expressions from the source code;
   a logical memory constraint generator configured to convert the plurality of tensor indexing expressions to a plurality of logical memory indexing constraints;

a grouping module configured to group the plurality of logical memory indexing constraints into concurrent access groups;

a memory partitioning module configured to determine a memory unit partitioning solution for each concurrent access group that supports the plurality of logical memory indexing constraints without concurrent usage conflicts including memory unit and memory port conflicts; and reconfigurable dataflow processor configured to execute the plurality of tensor indexing expressions and access the array of memory units according to the memory unit partitioning solution;

further comprising a capacity modification module configured to perform a capacity modification to legalize the memory unit partitioning solution; and wherein the capacity modification comprises scaling packing vector P or increasing a logical memory unit count N of a set of logical-to-physical mapping parameters.

4. A method for determining and using memory unit partitioning solutions for reconfigurable dataflow computing systems, the method comprising:

receiving source code for a reconfigurable dataflow processor that comprises an array of compute units and an array of memory units interconnected with a switching fabric, the source code comprising a plurality of tensor indexing expressions;

converting the plurality of tensor indexing expressions to a plurality of logical memory indexing constraints;

grouping the plurality of logical memory indexing constraints into concurrent access groups;

determining a memory unit partitioning solution for each concurrent access group that supports the plurality of logical memory indexing constraints without concurrent usage conflicts including memory unit and memory port conflicts; and accessing the array of memory units according to the memory unit partitioning solution in conjunction with executing the plurality of tensor indexing expressions with the reconfigurable dataflow processor;

wherein determining the memory unit partitioning solution comprises selecting a set of logical-to-physical mapping parameters; and wherein the set of logical-to-physical mapping parameters comprise a logical memory unit count N, a blocking parameter B, a scaling vector alpha and a packing vector P.

5. A method for determining and using memory unit partitioning solutions for reconfigurable dataflow computing systems, the method comprising:

receiving source code for a reconfigurable dataflow processor that comprises an array of compute units and an array of memory units interconnected with a switching fabric, the source code comprising a plurality of tensor indexing expressions;

converting the plurality of tensor indexing expressions to a plurality of logical memory indexing constraints;

grouping the plurality of logical memory indexing constraints into concurrent access groups;

determining a memory unit partitioning solution for each concurrent access group that supports the plurality of logical memory indexing constraints without concurrent usage conflicts including memory unit and memory port conflicts;

accessing the array of memory units according to the memory unit partitioning solution in conjunction with executing the plurality of tensor indexing expressions with the reconfigurable dataflow processor;

wherein determining the memory unit partitioning solution comprises selecting a set of logical-to-physical mapping parameters;

wherein the set of logical-to-physical mapping parameters comprise a logical memory unit count N, a blocking parameter B, a scaling vector alpha and a packing vector P; and wherein selecting comprises testing legal combinations of N, B and alpha.

6. A method for determining and using memory unit partitioning solutions for reconfigurable dataflow computing systems, the method comprising:

receiving source code for a reconfigurable dataflow processor that comprises an array of compute units and an array of memory units interconnected with a switching fabric, the source code comprising a plurality of tensor indexing expressions;

converting the plurality of tensor indexing expressions to a plurality of logical memory indexing constraints;

grouping the plurality of logical memory indexing constraints into concurrent access groups;

determining a memory unit partitioning solution for each concurrent access group that supports the plurality of logical memory indexing constraints without concurrent usage conflicts including memory unit and memory port conflicts; and accessing the array of memory units according to the memory unit partitioning solution in conjunction with executing the plurality of tensor indexing expressions with the reconfigurable dataflow processor;

further comprising performing a capacity modification to legalize the memory unit partitioning solution; and wherein the capacity modification comprises scaling a packing vector P or increasing a logical memory unit count N of a set of logical-to-physical mapping parameters.

* * * * *